US012422772B2

(12) United States Patent
Kashiwagura

(10) Patent No.: US 12,422,772 B2
(45) Date of Patent: Sep. 23, 2025

(54) IMAGE FORMING SYSTEM AND IMAGE FORMING METHOD FOR DETERMINING A CAUSE OF AN IMAGE DEFECT

(71) Applicant: Konica Minolta, Inc., Tokyo (JP)

(72) Inventor: Naoshi Kashiwagura, Hino (JP)

(73) Assignee: Konica Minolta, Inc., Tokyo (JP)

( * ) Notice: Subject to any disclaimer, the term of this patent is extended or adjusted under 35 U.S.C. 154(b) by 48 days.

(21) Appl. No.: 18/316,494

(22) Filed: May 12, 2023

(65) Prior Publication Data

US 2023/0393513 A1 Dec. 7, 2023

(30) Foreign Application Priority Data

Jun. 7, 2022 (JP) ................................ 2022-092123

(51) Int. Cl.
*G03G 15/00* (2006.01)
*G03G 21/20* (2006.01)

(52) U.S. Cl.
CPC ......... *G03G 15/55* (2013.01); *G03G 15/5062* (2013.01); *G03G 21/203* (2013.01)

(58) Field of Classification Search
USPC ........................................................... 399/15
See application file for complete search history.

(56) References Cited

U.S. PATENT DOCUMENTS

2011/0019245 A1* 1/2011 Adachi .............. H04N 1/00474
358/448
2019/0129342 A1* 5/2019 Ikeda ................... G03G 15/556
2020/0041937 A1* 2/2020 Tatezawa ............... G03G 15/55
2020/0153999 A1* 5/2020 Itou .................... G03G 15/5041

FOREIGN PATENT DOCUMENTS

JP 2011137895 A 7/2011

* cited by examiner

*Primary Examiner* — Quana Grainger
(74) *Attorney, Agent, or Firm* — Buchanan Ingersoll & Rooney PC

(57) ABSTRACT

An image forming system includes an image forming unit that forms an image on a sheet based on printing data, a first processor that inspects the image formed by the image forming unit, and a second processor that determines whether a cause of an image defect is a fixing defect when the image defect is found by the first processor.

10 Claims, 27 Drawing Sheets

IMAGE FORMING SYSTEM AND IMAGE FORMING METHOD FOR DETERMINING A CAUSE OF AN IMAGE DEFECT

The entire disclosure of Japanese patent Application No. 2022-092123, filed on Jun. 7, 2022, is incorporated herein by reference in its entirety.

BACKGROUND

Technological Field

The present disclosure relates to an image forming system and an image forming method.

Description of the Related Art

A technique in which a printed matter is read by a scanner or the like to inspect whether an image defect such as a void (white spot) or density unevenness is generated is known in order to provide the printed matter that meets need of a user. For example, Japanese Laid-Open Patent Publication No. 2011-137895 discloses an image forming apparatus that can accurately detect the void even when the void and the density unevenness are simultaneously generated.

SUMMARY

Generally, the image defect is generated due to at least one of a fixing defect and a transfer defect. In the image forming apparatus described in Japanese Laid-Open Patent Publication No. 2011-137895, the void can be detected even when the void and the density unevenness are simultaneously generated, but the cause of an image defect has not been known. Accordingly, the image is required to be visually checked by an expert to investigate the cause of the image defect, which becomes troublesome for the user.

An object of the present disclosure is to provide an image forming system and an image forming method capable of preventing the user from investigating the cause of the image defect.

To achieve at least one of the abovementioned objects, according to an aspect of the present invention, an image forming system reflecting one aspect of the present invention comprises an image forming unit that forms an image on a sheet based on printing data; a first processor that inspects the image formed by the image forming unit; and a second processor that determines whether a cause of an image defect is a fixing defect when the image defect is found by the first processor.

To achieve at least one of the abovementioned objects, according to an aspect of the present invention, an image forming method reflecting one aspect of the present invention comprises forming an image on a sheet based on printing data; inspecting the image; and determining whether a cause of an image defect is a fixing defect when the image defect is found.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
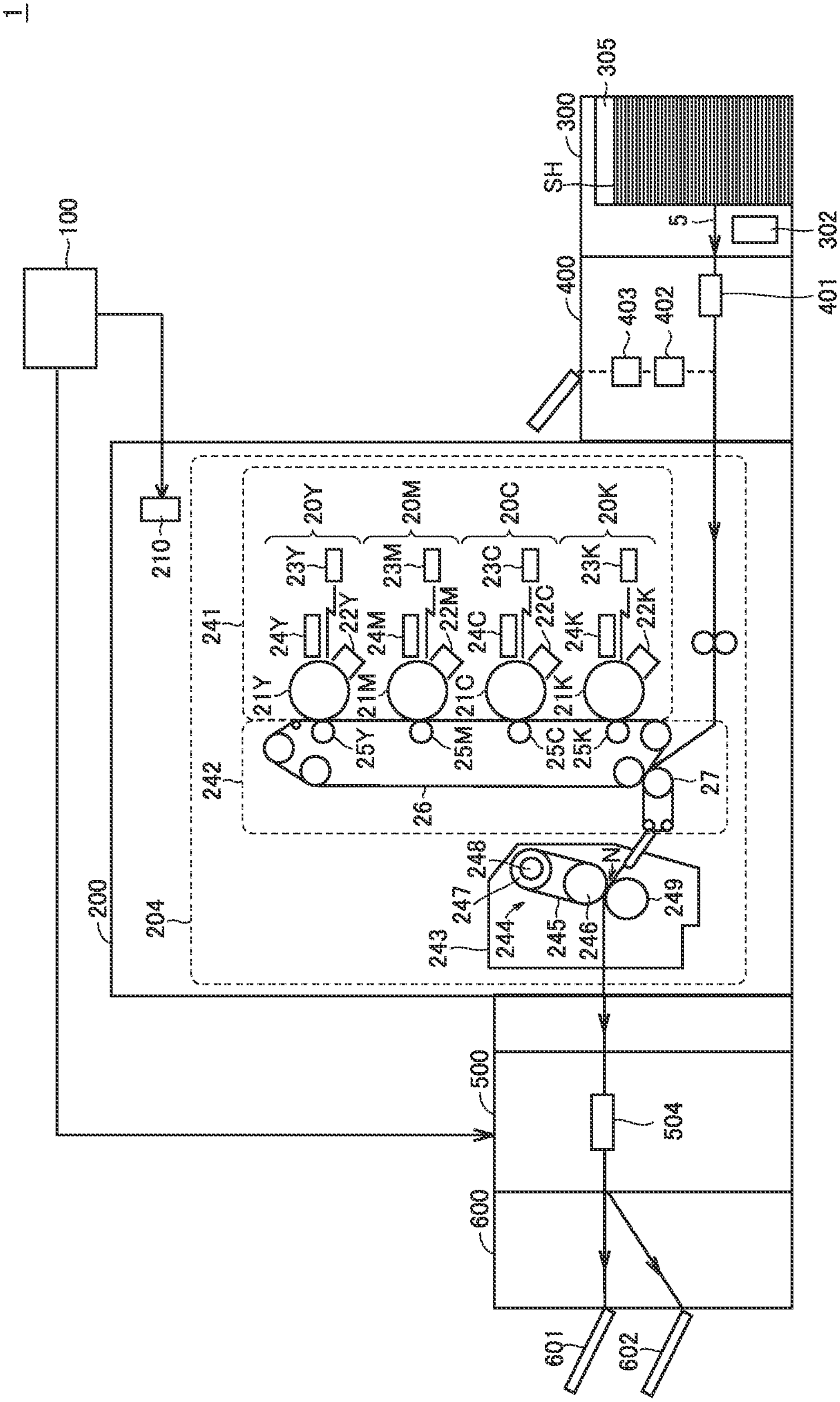
FIG. 1 is a view illustrating an image forming system according to a first embodiment.

Hereinafter, one or more embodiments of the present invention will be described with reference to the drawings. However, the scope of the invention is not limited to the disclosed embodiments.

In the following description, the same components and constituents are denoted by the same reference numerals. Those names and functions are the same. Thus, the detailed description thereof will not be repeated. The following embodiments and modifications described below may selectively be combined as appropriate.

First Embodiment

<A. Overview of Image Forming System>

With reference to FIG. 1, an outline of an image forming system according to a first embodiment will be described.

FIG. 1 is a view illustrating the image forming system of the first embodiment. An image forming system 1 of the first embodiment includes a controller 100, an image forming apparatus 200, a sheet feeder 300, a media sensor 400, an image inspection device 500, and a finisher 600.

Controller 100 controls entire image forming system 1. Specifically, controller 100 receives a print instruction from a user, and outputs printing data included in the print instruction and an image forming condition included in the print instruction to a control device 210 of image forming apparatus 200. The image forming condition includes at least one of a sheet thickness (hereinafter, also referred to as "set sheet thickness") of a sheet on which an image is formed, a basis weight (hereinafter, also referred to as "set basis weight") of the sheet, a type of the sheet, and an image forming speed. In addition, controller 100 outputs the image indicated by the printing data included in the print instruction to image inspection device 500 as a reference image for image inspection.

Image forming apparatus 200 includes a control device 210 and an image forming unit 204. Control device 210 executes various pieces of control related to image formation. Image forming unit 204 includes an imaging unit 241, a transfer unit 242, and a fixing unit 243, and forms the image on a sheet SH based on the printing data. When receiving the image forming condition from controller 100, control device 210 applies an imaging condition, a transfer condition, and a fixing condition based on the image forming condition to imaging unit 241, transfer unit 242, and fixing unit 243, and instructs sheet feeder 300 to start sheet feeding.

Sheet feeder 300 includes a sheet feeding tray 305 that stores sheets SH. In accordance with the instruction from control device 210, sheet feeder 300 feeds sheets SH in sheet feeding tray 305 one by one to a conveyance path 5. Conveyance path 5 is a path through which sheet SH is conveyed.

Sheet feeder 300 further includes a dehumidifying device 302 that dehumidifies sheet SH fed to image forming unit 204. Dehumidifying device 302 dehumidifies conveyed sheet SH in accordance with the instruction from control device 210.

Medium sensor 400 detects a physical property of conveyed sheet SH. Medium sensor 400 is provided on an upstream side of image forming unit 204 in conveyance path 5 of sheet SH. Accordingly, media sensor 400 detects the physical property of sheet SH before the image is formed by image forming unit 204.

Medium sensor 400 includes a first sensor 401, a second sensor 402, and a third sensor 403. First sensor 401 detects a water content, the basis weight, and the sheet thickness of sheet SH. Second sensor 402 detects a surface property of sheet SH. In the first embodiment, the surface property indicates roughness of the surface of sheet SH. Third sensor 403 detects a resistance value of sheet SH. Medium sensor 400 outputs the detected physical property of sheet SH to control device 210. The physical property of sheet SH detected by media sensor 400 is used for determining a content of feedback control described later.

Imaging unit 241 includes an imaging unit 20Y that forms a yellow toner image, an imaging unit 20M that forms a magenta toner image, an imaging unit 20C that forms a cyan toner image, and an imaging unit 20K that forms a key plate toner image.

Imaging unit 20Y includes a photoreceptor 21Y, a charging device 22Y, an exposure device 23Y, and a developing device 24Y. Imaging unit 20M includes a photoreceptor 21M, a charging device 22M, an exposure device 23M, and a developing device 24M. Imaging unit 20C includes a photoreceptor 21C, a charging device 22C, an exposure device 23C, and a developing device 24C. Imaging unit 20K includes a photoreceptor 21K, a charging device 22K, an exposure device 23K, and a developing device 24K.

In the following description, photoreceptor 21Y, photoreceptor 21M, photoreceptor 21C, and photoreceptor 21K are referred to as "photoreceptor 21" when not distinguished from each other. In the following description, charging device 22Y, charging device 22M, charging device 22C, and charging device 22K are referred to as "charging device 22" when not distinguished from each other. In the following description, exposure device 23Y, exposure device 23M, exposure device 23C, and exposure device 23K are referred to as "exposure device 23" when not distinguished from each other. In the following description, developing device 24Y, developing device 24M, developing device 24C, and developing device 24K are referred to as "developing devices 24" when not distinguished from each other.

Transfer unit 242 includes a primary transfer device 25Y, a primary transfer device 25M, a primary transfer device 25C, a primary transfer device 25K, an intermediate transfer belt 26, and a secondary transfer device 27. In the following description, primary transfer device 25Y, primary transfer device 25M, primary transfer device 25C, and primary transfer device 25K are referred to as "primary transfer devices 25" when not distinguished from each other.

Image forming unit 204 forms the image on sheet SH as follows. First, charging device 22 imparts a negative charge to entire photoreceptor 21. Subsequently, exposure device 23 irradiates negatively charged photoreceptor 21 with a laser beam based on the printing data. A positive charge is generated at a place irradiated with the laser beam, and the negative charge disappears. Consequently, a latent image of the printing data is formed on photoreceptor 21. Subsequently, developing device 24 supplies negatively charged toner to photoreceptor 21. Thus, the toner adheres to a place where no negative charge on photoreceptor 21 is applied, and the latent image is visualized. That is, a toner image based on the printing data is formed on photoreceptor 21.

Subsequently, primary transfer device 25 transfers the toner image formed on photoreceptor 21 to intermediate transfer belt 26. Because intermediate transfer belt 26 rotates, the toner images of the respective colors are superimposed on intermediate transfer belt 26. As a result, the toner image based on the printing data is formed on intermediate transfer belt 26. In the following description, transferring the toner image formed on photoreceptor 21 to intermediate transfer belt 26 is referred to as "primary transfer".

Subsequently, secondary transfer device 27 transfers the toner images superimposed on intermediate transfer belt 26 to conveyed sheet SH. In the following description, transferring the toner images superimposed on intermediate transfer belt 26 to conveyed sheet SH is referred to as "secondary transfer".

Subsequently, fixing unit 243 applies heat and pressure to sheet SH to which the toner image is transferred and fixes the toner image on sheet SH. That is, fixing unit 243 performs fixing processing for fixing the image on sheet SH.

Particularly, fixing unit 243 includes a fixing member 244 and a pressure roller 249. Fixing member 244 includes a fixing belt 245, a fixing roller 246, a heating roller 247, and a heating source 248. Fixing belt 245 is formed of a belt-shaped belt body and circulates in an annular shape. Fixing roller 246, heating roller 247, and heating source 248 are disposed on an inner peripheral side of fixing belt 245. Fixing belt 245 is wound around fixing roller 246 and heating roller 247. Heating source 248 heats fixing belt 245 wound around heating roller 247 through heating roller 247. A temperature sensor (not illustrated) is provided in fixing unit 243, and heating source 248 is controlled such that a predetermined temperature target is achieved.

Pressure roller 249 is disposed opposite to fixing member 244. Pressure roller 249 forms a fixing nip portion N where sheet SH is conveyed together with fixing member 244. Pressure roller 249 presses sheet SH against fixing member 244 at fixing nip portion N. The image is fixed to sheet SH by fixing unit 243, and the image formation by image forming unit 204 ends.

Image inspection device 500 includes an imaging sensor 504. Imaging sensor 504 is a reflective optical sensor incorporating a light emitting element such as a light emitting diode and a light receiving element such as a photodiode. Imaging sensor 504 scans conveyed sheet SH, namely, the printed matter on which the image is formed by image forming unit 204, to read the image formed by image forming unit 204. In the following description, the image read by imaging sensor 504 is referred to as "read image". Image inspection device 500 compares the read image with the above-described reference image to inspect presence or absence of an image defect due to the void (white spot) in the image formed by image forming unit 204.

In addition, imaging sensor 504 acquires information indicating the surface property of conveyed sheet SH. For example, the information indicating the surface property of conveyed sheet SH is information indicating a scattering degree of light on the surface of sheet SH obtained by irradiating conveyed sheet SH with light. Imaging sensor 504 may be configured to be able to acquire a three-dimensional shape of conveyed sheet SH. When imaging sensor 504 is configured to be able to acquire the three-dimensional shape of conveyed sheet SH, the information indicating the surface property of conveyed sheet SH may be information about the three-dimensional shape of sheet SH.

Image inspection device 500 outputs the read image, the reference image, and the inspection result to control device 210. In the first embodiment, the inspection result includes the presence or absence of the image defect due to the void and the information indicating the surface property of conveyed sheet SH.

In accordance with an instruction from control device 210, finisher 600 performs post-processing such as stapling processing or punching on conveyed sheet SH, and discharge sheet SH to a sheet discharge tray 601 or a sheet discharge tray 602. Sheet discharge tray 601 is a tray from which the sheet determined that the image defect due to the void does not exist is discharged. Sheet discharge tray 602 is a tray from which the sheet determined that the image defect due to the void exists is discharged.

When the inspection result received from image inspection device 500 indicates that the image defect due to the void exists, control device 210 determines whether the cause of the void is a fixing defect. The fixing defect is a defect of fixing processing by fixing unit 243. When the cause of the void is the fixing defect, control device 210 performs feedback control according to the physical property of sheet SH received from media sensor 400.

B. Hardware Configuration Example of Controller 100

Figure 2:
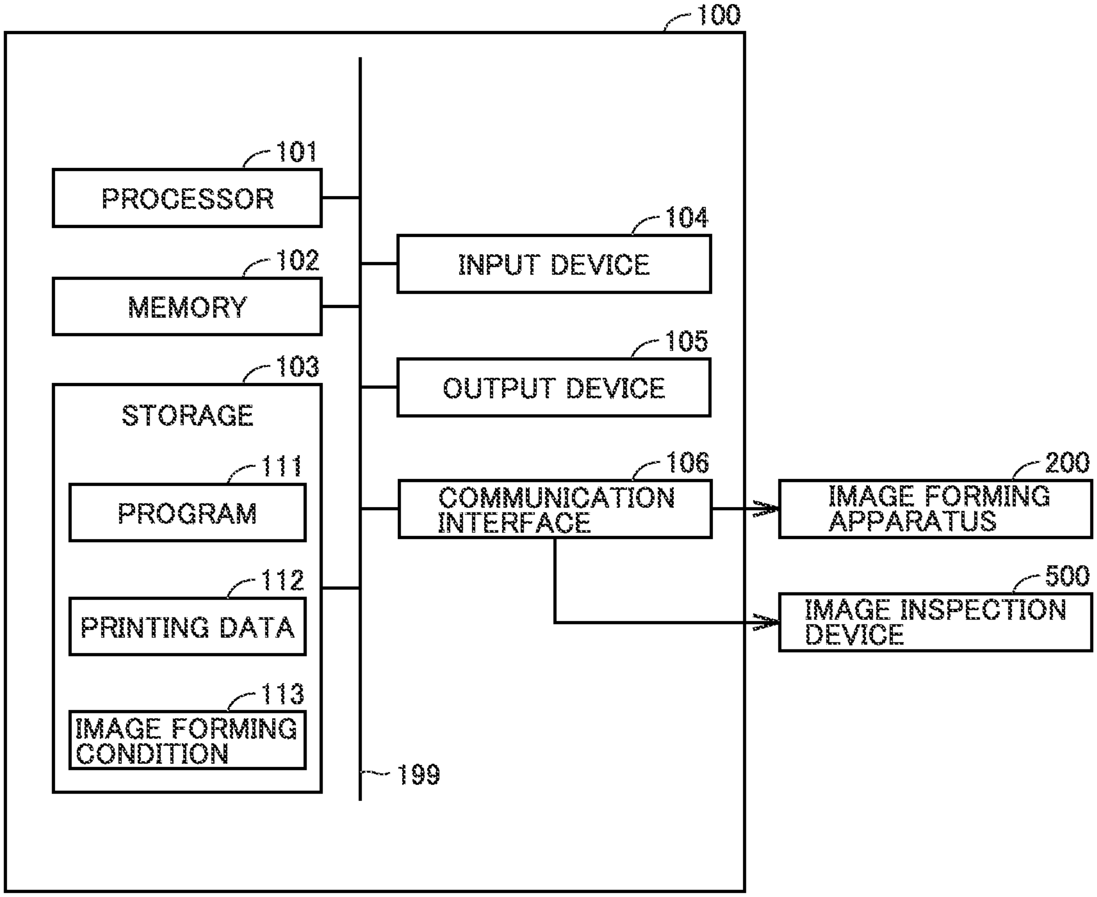
FIG. 2 is a view illustrating an example of a hardware configuration of a controller of the first embodiment.

With reference to FIG. 2, a hardware configuration example of controller 100 of the first embodiment will be described.

FIG. 2 is a view illustrating the hardware configuration example of the controller of the first embodiment. Controller 100 of the first embodiment includes a processor 101, a memory 102, a storage 103, an input device 104, an output device 105, and a communication interface 106. Processor 101, memory 102, storage 103, input device 104, output device 105, and communication interface 106 are electrically connected through a bus 199.

Processor 101 is configured of a central processing unit (CPU), a micro processing unit (MPU), and the like. Memory 102 is configured of a volatile storage device such as a dynamic random access memory (DRAM) or a static random access memory (SRAM). Storage 103 includes a non-volatile storage device such as a solid state drive (SSD) or a flash memory. Storage 103 stores a program 111. Program 111 includes computer-readable instructions controlling controller 100. Processor 101 develops a program 111 stored in storage 103 on memory 102, and executes program 111, thereby implementing various pieces of processing of the first embodiment.

Program 111 may be provided not as a stand-alone program, but as a part of an arbitrary program. In this case, the processing according to the first embodiment is performed in cooperation with an arbitrary program. Even a program that does not include such a part of modules does not deviate from the purpose of controller 100 of the embodiment. Furthermore, some or all of the functions provided by program 111 may be performed by dedicated hardware.

Storage 103 further stores printing data 112 included in the print instruction received from the user and an image forming condition 113 included in the print instruction. As described above, image forming condition 113 includes at least one of the sheet thickness of the sheet on which the image is formed, the basis weight of the sheet, the type of the sheet, and the speed of image formation.

Input device 104 receives a user operation. For example, input device 104 includes at least one of a keyboard, a mouse, a touch panel, and a button.

Output device 105 outputs various pieces of information to the user. For example, output device 105 is a display.

Communication interface 106 is responsible for transmission and reception of data between controller 100 and image forming apparatus 200. In addition, communication interface 106 is in charge of transmission and reception of data between controller 100 and image inspection device 500.

Specifically, controller 100 transmits printing data 112 and image forming condition 113 to image forming apparatus 200 through communication interface 106. In addition, controller 100 transmits the image indicated by printing data

112, namely, the reference image to image inspection device 500 through communication interface 106.

C. Hardware Configuration Example of Image Forming Apparatus 200

Figure 3:
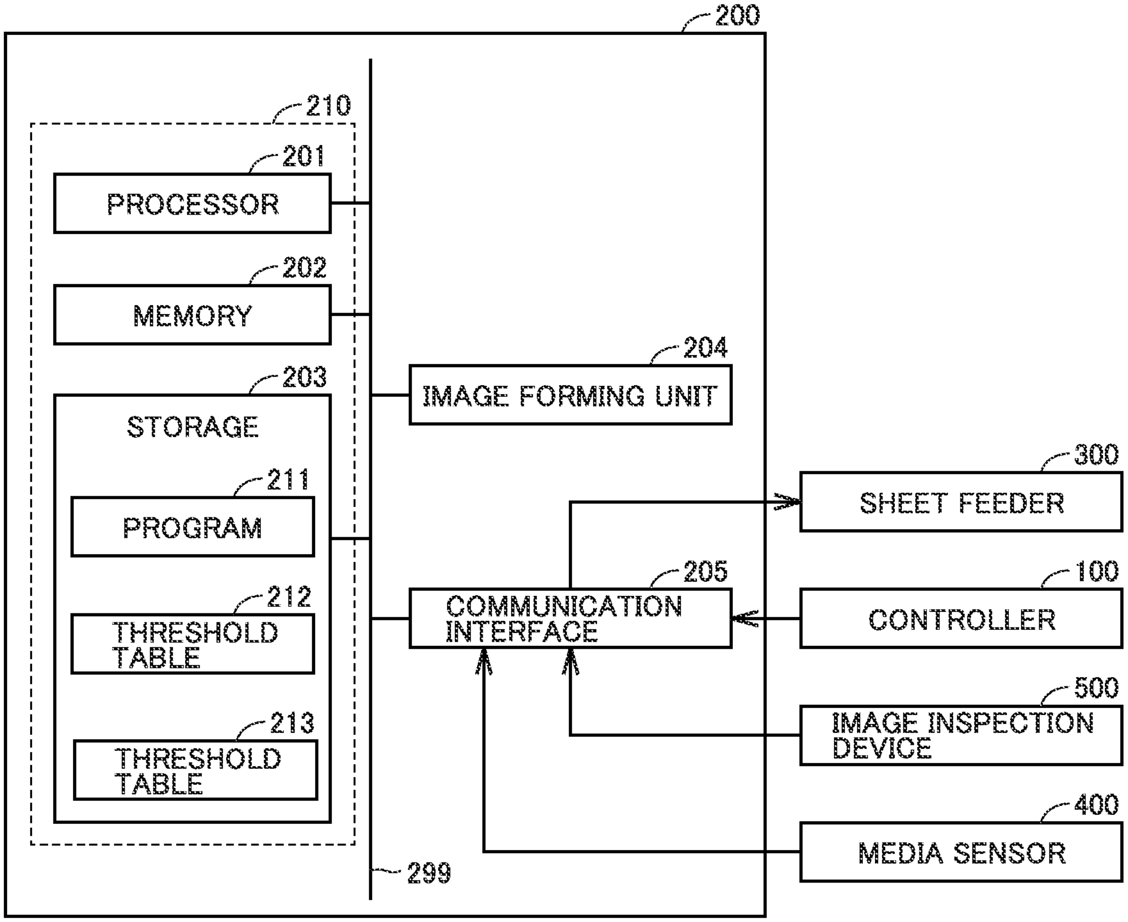
FIG. 3 is a view illustrating an example of a hardware configuration of an image forming apparatus of the first embodiment.

With reference to FIG. 3, a hardware configuration example of image forming apparatus 200 of the first embodiment will be described.

FIG. 3 is a view illustrating the hardware configuration example of the image forming apparatus of the first embodiment. Image forming apparatus 200 of the first embodiment further includes a communication interface 205 in addition to control device 210 and image forming unit 204 in FIG. 1. Control device 210, image forming unit 204, and communication interface 205 are electrically connected through a bus 299.

Control device 210 includes a processor 201, a memory 202, and a storage 203. Processor 201 includes a CPU or an MPU. Processor 201 is an example of the "second processor" in the present disclosure. Memory 202 is configured of a volatile storage device such as a DRAM or an SRAM. For example, storage 203 is configured of the non-volatile storage device such as an SSD or a flash memory. Storage 203 stores a program 211. Program 211 includes computer-readable instructions controlling image forming apparatus 200. Processor 201 develops program 211 stored in storage 203 on memory 202, and executes the program, thereby implementing various pieces of processing of the first embodiment.

Program 211 may be provided not as a stand-alone program, but as a part of an arbitrary program. In this case, the processing according to the first embodiment is performed in cooperation with an arbitrary program. Even a program that does not include such a part of modules does not deviate from the purpose of image forming apparatus 200 of the first embodiment. Furthermore, some or all of the functions provided by program 211 may be performed by dedicated hardware.

Storage 203 further stores a threshold table 212 used to determine whether the cause of the void is the fixing defect. Threshold table 212 includes a threshold used for determination by size, a threshold used for determination by image density, and a threshold used for determination by surface property for each image forming condition. The determination by size, the determination by image density, and the determination by surface property will be described later. In the first embodiment, the threshold used for the determination by size, the threshold used for the determination by image density, and the threshold used for the determination by surface property are referred to as "threshold for size determination", "threshold for image density determination", and "threshold for surface property determination", respectively.

Storage 203 further stores a threshold table 213 used to determine the content of the feedback control. Threshold table 213 includes a threshold of the water content of the sheet and a threshold of the surface property of the sheet for each image forming condition.

Communication interface 205 is responsible for transmission and reception of data between image forming apparatus 200 and sheet feeder 300. In addition, communication interface 205 is responsible for transmission and reception of data between image forming apparatus 200 and controller 100. In addition, communication interface 205 is responsible for transmission and reception of data between image forming apparatus 200 and image inspection device 500. In addition, communication interface 205 is responsible for transmission and reception of data between image forming apparatus 200 and media sensor 400.

Specifically, image forming apparatus 200 transmits a sheet feeding start instruction to sheet feeder 300 through communication interface 205. Image forming apparatus 200 receives printing data 112 and image forming condition 113 from controller 100 through communication interface 205. Image forming apparatus 200 receives the read image, the reference image, and the inspection result from image inspection device 500 through communication interface 205. In addition, image forming apparatus 200 receives the physical property of sheet SH from media sensor 400 through communication interface 205.

D. Hardware Configuration Example of Image Inspection Device 500

Figure 4:
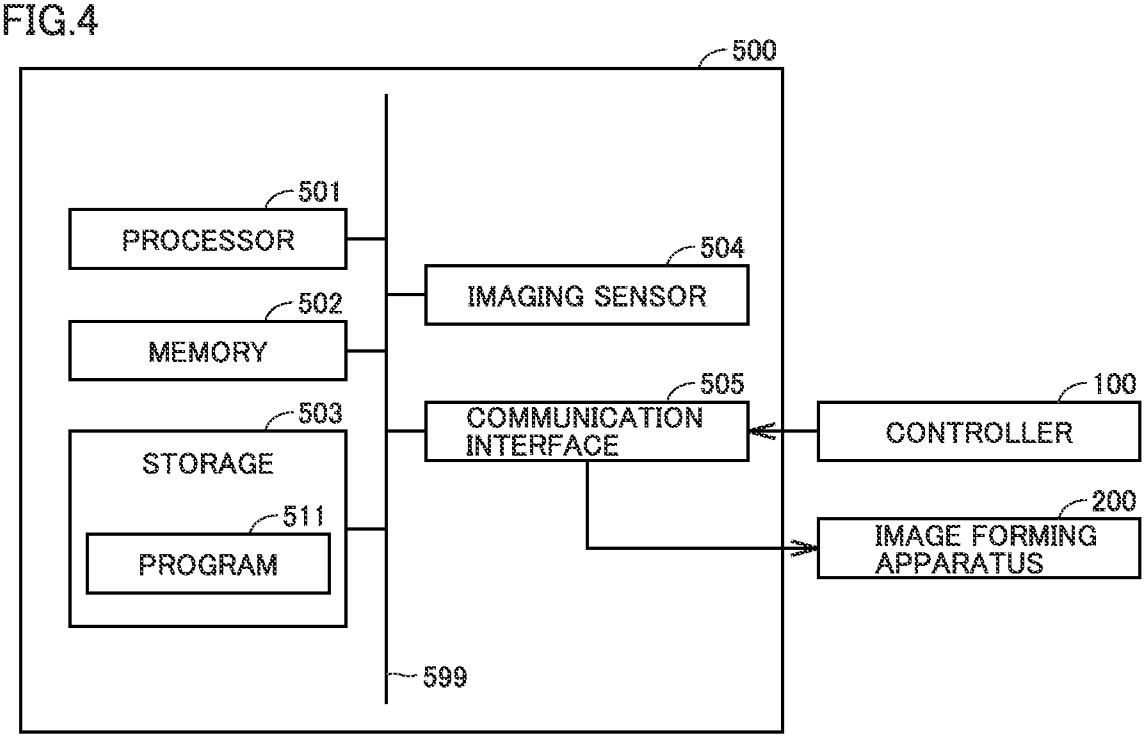
FIG. 4 is a view illustrating an example of a hardware Configuration of an image inspection device of the first embodiment.

With reference to FIG. 4, a hardware configuration example of image inspection device 500 of the first embodiment will be described.

FIG. 4 is a view illustrating the hardware configuration example of the image inspection device of the first embodiment. Image inspection device 500 of the first embodiment further includes a processor 501, a memory 502, a storage 503, and a communication interface 505 in addition to imaging sensor 504 in FIG. 1. Processor 501, memory 502, storage 503, imaging sensor 504, and communication interface 505 are electrically connected through a bus 599.

Processor 501 includes a CPU or an MPU. Processor 501 is an example of the "first processor" in the present disclosure. Memory 502 is configured of a volatile storage device such as a DRAM or an SRAM. For example, storage 503 is configured of the non-volatile storage device such as an SSD or a flash memory. Storage 503 stores a program 511. Program 511 includes computer-readable instructions controlling image inspection device 500. Processor 501 develops program 511 stored in storage 503 on memory 502, and executes the program, thereby implementing various pieces of processing of the first embodiment.

Program 511 may be provided not as a stand-alone program, but as a part of an arbitrary program. In this case, the processing according to the first embodiment is performed in cooperation with an arbitrary program. Even a program that does not include such a part of modules does not deviate from the purpose of image inspection device 500 of the first embodiment. Furthermore, some or all of the functions provided by program 511 may be performed by dedicated hardware.

Communication interface 505 is responsible for transmission and reception of data between image inspection device 500 and controller 100. In addition, communication interface 505 is responsible for transmission and reception of data between image inspection device 500 and image forming apparatus 200.

Specifically, image inspection device 500 receives the reference image from controller 100 through communication interface 505. Image inspection device 500 transmits the read image, the reference image, and the inspection result to image forming apparatus 200 through communication interface 505.

<E. Processing in Image Forming System 1>

With reference to FIGS. 5 to 20, processing in image forming system 1 of the first embodiment will be described.

(E1: Outline of Processing in Image Forming System 1)

Figure 5:
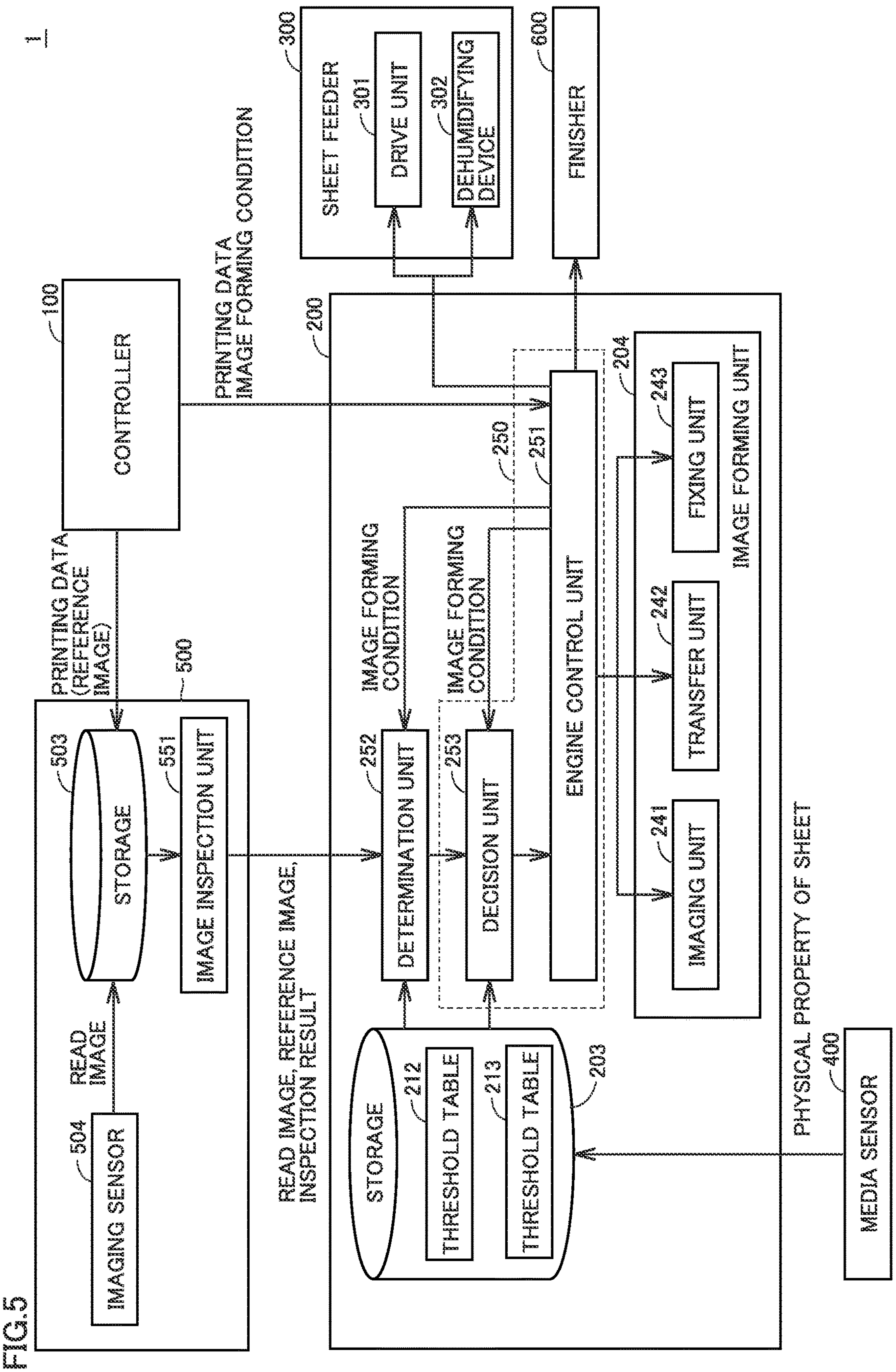
FIG. 5 is a view illustrating an outline of processing of the image forming system of the first embodiment.

FIG. 5 is a view illustrating an outline of the processing of the image forming system of the first embodiment. Image forming apparatus 200 includes a feedback control unit 250 and a determination unit 252. Feedback control unit 250 includes an engine control unit 251 and a decision unit 253. Feedback control unit 250, engine control unit 251, determination unit 252, and decision unit 253 are implemented by processor 201 executing program 211. A drive unit 301 is a roller or the like that is included in sheet feeder 300 and feeds sheets SH in a sheet feeding tray 305 one by one to conveyance path 5. An image inspection unit 551 is included in image inspection device 500, and is implemented by processor 501 executing program 511.

When receiving the print instruction from the user, controller 100 transmits the printing data included in the print instruction and the image forming condition included in the print instruction to image forming apparatus 200. In addition, controller 100 transmits the image indicated by the printing data included in the print instruction to image inspection device 500 as the reference image for image inspection. The reference image is stored in storage 503.

Engine control unit 251 applies the imaging condition, the transfer condition, and the fixing condition based on the image forming condition received from controller 100 to imaging unit 241, transfer unit 242, and fixing unit 243, and instructs drive unit 301 to start the sheet feeding. Thus, sheet SH is fed from sheet feeding tray 305 to conveyance path 5.

Engine control unit 251 also outputs the image forming condition received from controller 100 to determination unit 252 and decision unit 253.

When receiving the instruction related to the post-processing from controller 100, engine control unit 251 transmits the instruction related to the post-processing to finisher 600.

Medium sensor 400 detects the physical property of conveyed sheet SH, and transmits the detected physical property of sheet SH to image forming apparatus 200. The physical property of sheet SH detected by media sensor 400 is stored in storage 203 and referred to when feedback control unit 250 performs the feedback control.

Image forming unit 204 forms the image on conveyed sheet SH based on the printing data.

Imaging sensor 504 scans conveyed sheet SH, namely, the printed matter on which the image is formed by image forming unit 204, to read the image formed by image forming unit 204. In addition, imaging sensor 504 acquires information indicating the surface property of conveyed sheet SH. The read image and the information indicating the surface property of sheet SH are stored in storage 503.

Image inspection unit 551 inspects the image formed by image forming unit 204. Specifically, image inspection unit 551 compares the read image with the reference image to determine whether a blank area having a predetermined size or more exists on which no image is placed in an area corresponding to an image area in the reference image in the read image. The image area is an area on which the image is placed in the reference image. When the blank area exists, image inspection unit 551 specifies the blank area as a void area in the image formed by image forming unit 204 and determines that the image defect due to avoid exists. Image inspection unit 551 outputs the read image, the reference image, and the inspection result to image forming apparatus 200.

When image inspection unit 551 determines that the image defect due to the void exists, determination unit 252 determines whether the cause of the image defect is the fixing defect. As an example, determination unit 252 acquires the threshold corresponding to the image forming condition of image forming unit 204 from threshold table 212, and determines whether the cause of the image defect is the fixing defect according to a procedure described later.

When determination unit 252 determines that the cause of the image defect is the fixing defect, feedback control unit 250 performs the feedback control based on the physical property of sheet SH stored in storage 203. The feedback control may be performed by changing the fixing condition or performing dehumidification control by dehumidifying device 302. The fixing condition includes at least one of a fixing temperature, a nip pressure for fixing, a fixing speed, and an inter-sheet distance.

The fixing temperature is a surface temperature of fixing belt 245. The fixing temperature can be changed by adjusting the temperature of heating source 248. A larger amount of heat is applied to the sheet by increasing the fixing temperature, so that stronger fixability can be secured.

The nip pressure for fixing is force with which pressure roller 249 presses sheet SH against fixing member 244. More pressure is applied to the sheet by increasing the nip pressure for fixing, so that stronger fixability can be secured.

The fixing speed is a conveyance speed of sheet SH during fixing processing. Sheet SH is heated and pressed at fixing nip portion N for a longer time by lowering the fixing speed, so that stronger fixability can be secured.

The inter-sheet distance is an interval between sheets on conveyance path 5. When the inter-sheet distance is increased, the time from when a certain sheet finishes passing through fixing nip portion N until the succeeding sheet of the certain sheet reaches fixing nip portion N becomes long, so that the time when the fixing temperature is raised to the target temperature can be secured. Accordingly, stronger fixability can be secured.

Feedback control unit 250 includes an engine control unit 251 and a decision unit 253. Decision unit 253 acquires the threshold corresponding to the image forming condition of image forming unit 204 from threshold table 213. Decision unit 253 decides the content of the feedback control and the sheet to which the feedback control is applied, and outputs the decided content to engine control unit 251. Engine control unit 251 controls units and devices related to the feedback control based on the decided content received from decision unit 253. As an example, when the feedback control is the change of the fixing condition, engine control unit 251 changes the fixing condition in accordance with the instruction to change the fixing condition included in the decided content received from decision unit 253. On the other hand, when the feedback control is the dehumidification control by dehumidifying device 302, engine control unit 251 instructs dehumidifying device 302 to start dehumidification.

(E2: Processing Procedure of Image Forming System 1)

Figure 6:
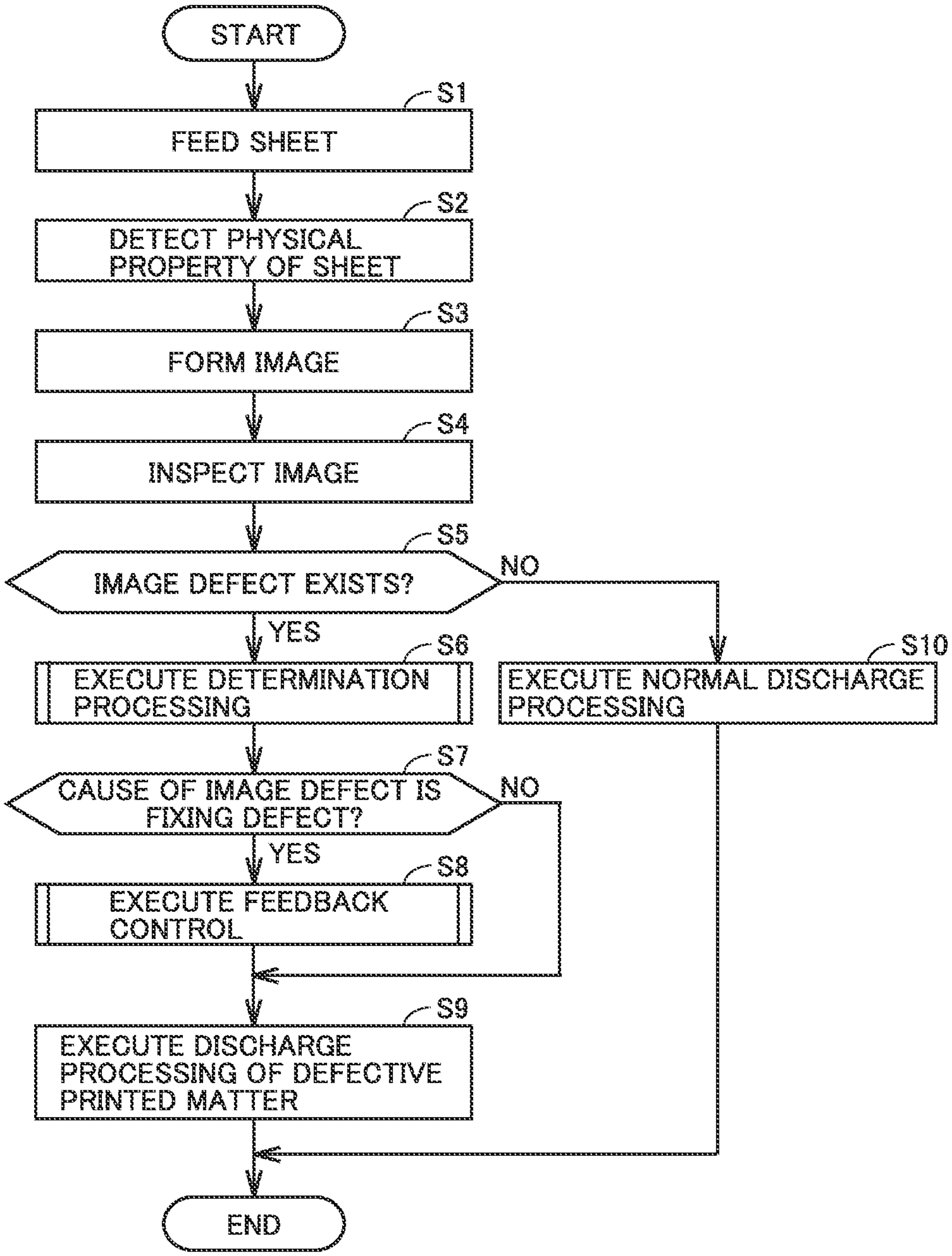
FIG. 6 is a flowchart illustrating a processing procedure of the image forming system of the first embodiment.

FIG. 6 is a flowchart illustrating a processing procedure of the image forming system of the first embodiment. A series of processing in FIG. 6 is started when controller 100 receives the print instruction.

In step S1, sheet feeder 300 feeds sheet SH. That is, sheet feeder 300 feeds sheet SH from sheet feeding tray 305 to conveyance path 5.

In step S2, media sensor 400 detects the physical property of conveyed sheet SH.

In step S3, image forming unit 204 forms the image on sheet SH based on the printing data.

In step S4, image inspection device 500 (processor 501) reads the image formed by image forming unit 204 and inspects the image.

In step S5, control device 210 determines whether the image defect due to the void exists. Control device 210 determines the presence or absence of the image defect due to the void based on the inspection result received from image inspection device 500. When the image defect due to the void exists (YES in step S5), control device 210 advances the processing to step S6. On the other hand, when the image defect due to the void does not exist (NO in step S5), control device 210 advances the processing to step S10.

In step S6, control device 210 executes determination processing.

In step S7, control device 210 determines whether the cause of the image defect is the fixing defect. When the cause of the image defect is the fixing defect (YES in step S7), control device 210 advances the processing to step S8. On the other hand, when the cause of the image defect is not the fixing defect (NO in step S7), control device 210 advances the processing to step S9.

In step S8, control device 210 executes the feedback control.

In step S9, control device 210 executes discharge processing of the defective printed matter. Specifically, control device 210 controls the conveyance of sheet SH such that sheet SH is discharged to sheet discharge tray 602. Thus, the sheet determined to have the image defect due to the void is discharged to sheet discharge tray 602.

In step S10, control device 210 executes normal discharge processing. Specifically, control device 210 controls the conveyance of sheet SH such that sheet SH is discharged to sheet discharge tray 601. Thus, the sheet determined that the image defect due to the void does not exist is discharged to sheet discharge tray 601.

After step S9 or step S10, the series of processing in FIG. 6 ends.

(E3: Procedure of Determination Processing)

Figure 7:
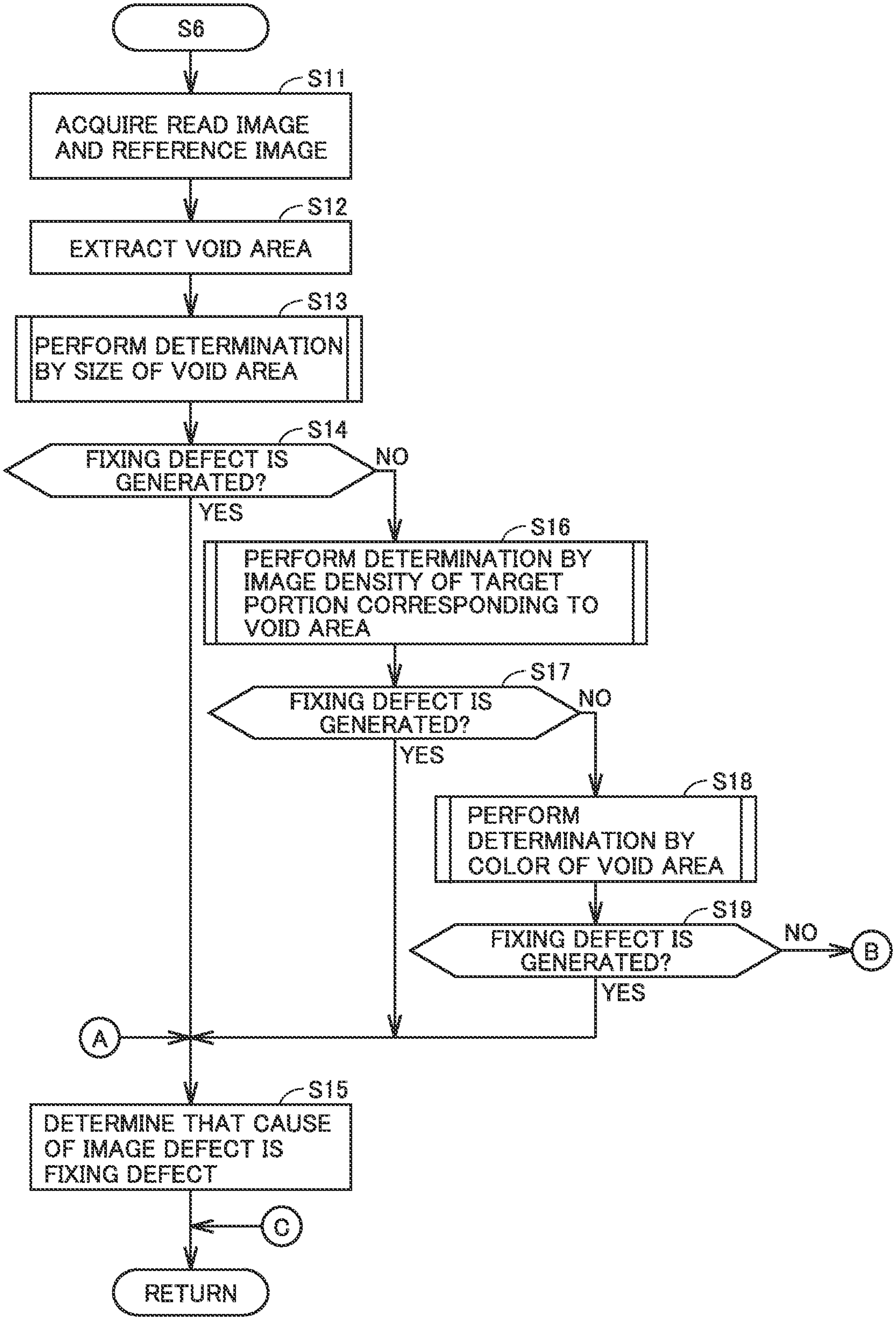
FIG. 7 is a flowchart illustrating a part of a processing procedure of a subroutine in step S6 of the first embodiment.
Figure 8:
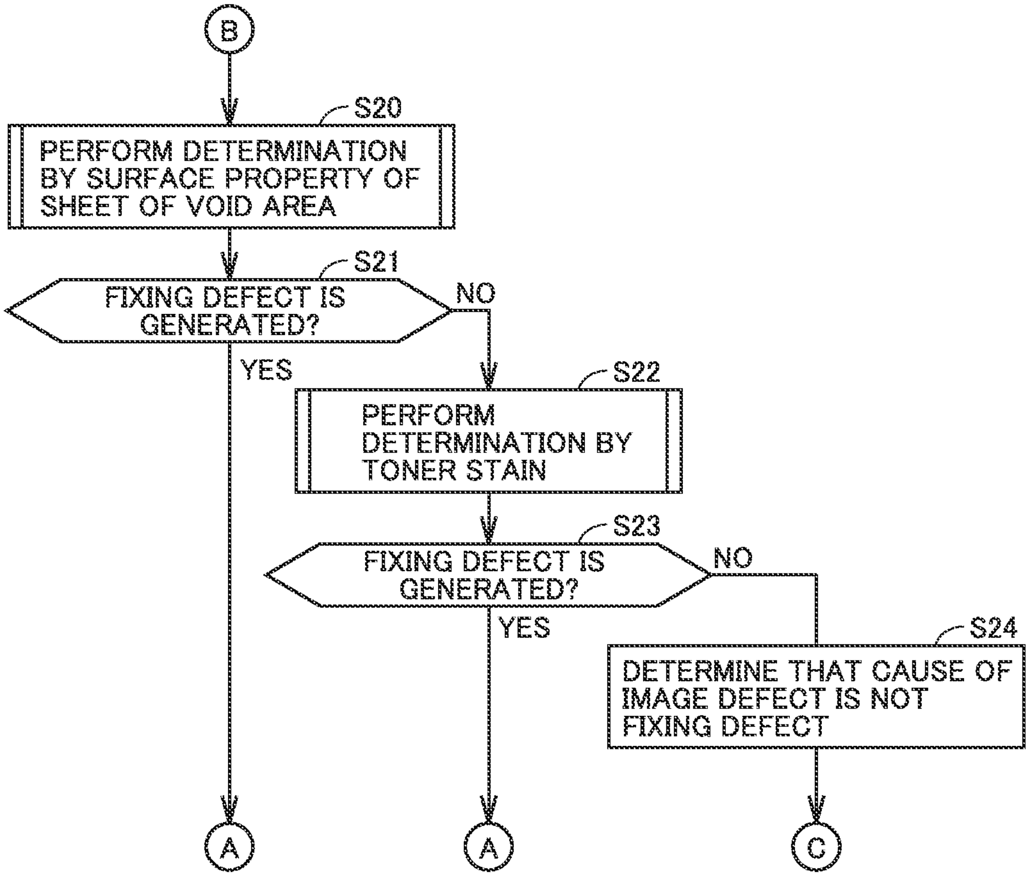
FIG. 8 is a flowchart illustrating another part of the processing procedure of the subroutine in step S6 of the first embodiment.

With reference to FIGS. 7 and 8, the procedure of the determination processing in step S6 will be described. FIG. 7 is a flowchart illustrating a part of a processing procedure of a subroutine in step S6 of the first embodiment. FIG. 8 is a flowchart illustrating another part of the processing procedure of the subroutine in step S6 of the first embodiment. The determination processing in FIGS. 7 and 8 is processing performed by above-described determination unit 252, namely, processor 201. The determination processing in FIGS. 7 and 8 is started when image inspection device 500 determines that the image defect due to the void exists.

In step S11, processor 201 acquires the read image and the reference image from image inspection device 500.

In step S12, processor 201 extracts the void area in the read image. As an example, processor 201 extracts the blank area having a predetermined size or more on which no image is placed in an area corresponding to the image area in the reference image in the read image as the void area in the read image. The void area extracted in step S12 indicates the void area in the image formed by image forming unit 204.

In step S13, processor 201 performs determination by a size of the void area in the read image. In the first embodiment, the determination in step S13 is referred to as "determination by size".

In step S14, processor 201 determines whether the fixing defect is generated. When the fixing defect is generated (YES in step S14), processor 201 advances the processing to step S15. On the other hand, when the fixing defect is not generated (NO in step S14), processor 201 advances the processing to step S16.

In step S16, processor 201 performs determination by an image density of the target portion corresponding to the void area of the read image in the reference image. In the first embodiment, the determination in step S16 is referred to as "determination by image density".

In step S17, processor 201 determines whether the fixing defect is generated. When the fixing defect is generated (YES in step S17), processor 201 advances the processing to step S15. On the other hand, when the fixing defect is not generated (NO in step S17), processor 201 advances the processing to step S18.

In step S18, processor 201 performs determination by a color of the void area in the read image. In the first embodiment, the determination in step S18 is referred to as "determination by color".

In step S19, processor 201 determines whether the fixing defect is generated. When the fixing defect is generated (YES in step S19), processor 201 advances the processing to step S15. On the other hand, when the fixing defect is not generated (NO in step S19), processor 201 advances the processing to step S20.

In step S20, processor 201 performs determination by a surface property of sheet SH of the void area. In the first embodiment, the determination in step S20 is referred to as "determination by surface property".

In step S21, processor 201 determines whether the fixing defect is generated. When the fixing defect is generated (YES in step S21), processor 201 advances the processing to step S15. On the other hand, when the fixing defect is not generated (NO in step S21), processor 201 advances the processing to step S22.

In step S22, processor 201 performs determination by a toner stain having the same size as the void area in the read image. In the first embodiment, the determination in step S22 is referred to as "determination by toner stain".

In step S23, processor 201 determines whether the fixing defect is generated. When the fixing defect is generated (YES in step S23), processor 201 advances the processing to step S15. On the other hand, when the fixing defect is not generated (NO in step S23), processor 201 advances the processing to step S24.

In step S15, processor 201 determines that the cause of the image defect is the fixing defect. In step S24, processor 201 determines that the cause of the image defect is not the fixing defect. After step S15 or step S24, the processing returns to step S7.

(E4: Determination by Size)

Figure 9:
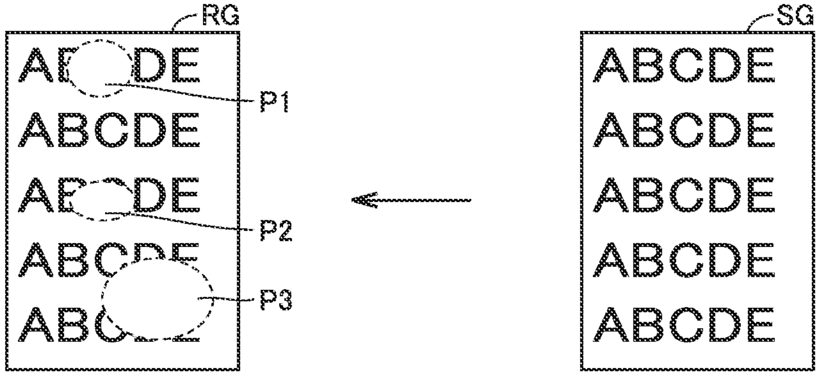
FIG. 9 is a diagram illustrating a first example of a read image and a reference image of the first embodiment.
Figure 10:
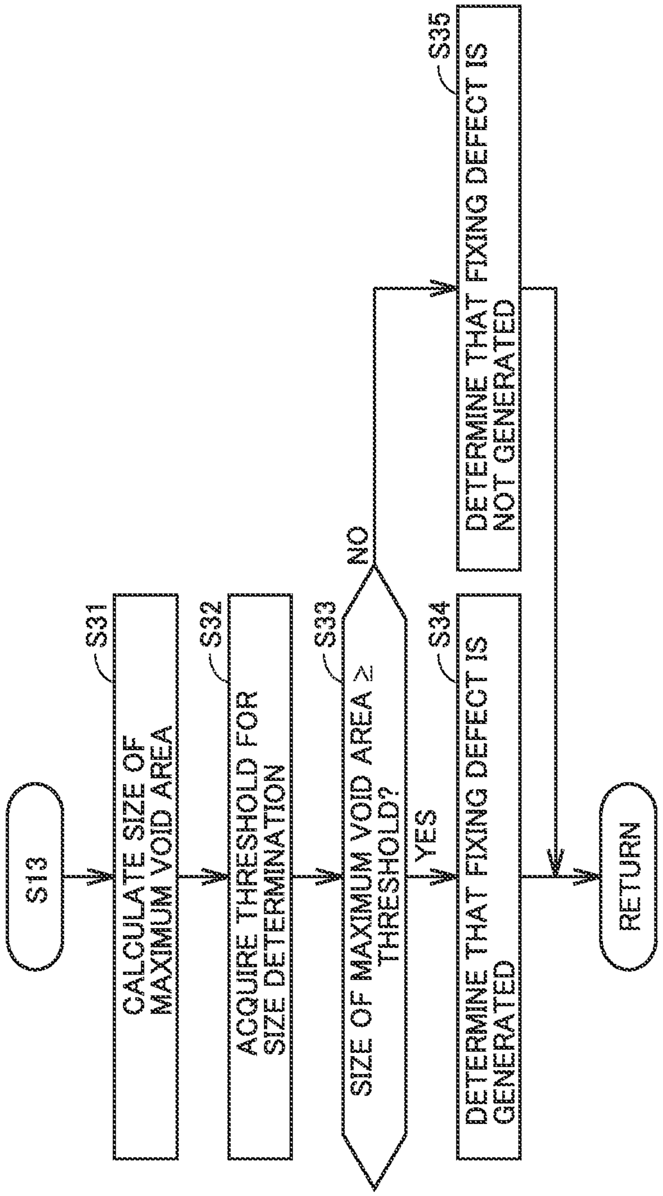
FIG. 10 is a flowchart illustrating a processing procedure of a subroutine in step S13 of the first embodiment.

With reference to FIGS. 9 and 10, details of the determination in step S13 described above, namely, the determination by size will be described.

FIG. 9 is a diagram illustrating first examples of the read image and the reference image of the first embodiment. FIG. 9 illustrates a read image RG and a reference image SG acquired by processor 201 from image inspection device 500 in step S11 described above. In the example in FIG. 9, read image RG includes avoid area P1, a void area P2, and avoid area P3. That is, the image defect due to the void is generated in read image RG. In the example of FIG. 9, the maximum void area among the three void areas is void area P3.

The cause of the void is considered to be the fixing defect or the transfer defect. As described above, the fixing defect is a defect of the fixing processing by fixing unit 243. On the other hand, the transfer defect is a defect of the transfer processing by transfer unit 242. The transfer processing includes primary transfer and secondary transfer. The size of the void due to the fixing defect tends to be larger than that of the void due to the transfer defect.

Accordingly, processor 201 determines that the cause of the image defect is the fixing defect when the size of the maximum defective portion in at least one defective portion of read image RG is greater than or equal to the threshold for size determination corresponding to the image forming condition of image forming unit 204.

In the example of FIG. 9, processor 201 determines that the cause of the image defect is the fixing defect when the size of void area P3 that is the maximum void area is greater than or equal to the threshold for size determination corresponding to the image forming condition of image forming unit 204.

With reference to FIG. 10, a processing procedure of the determination by size will be described. FIG. 10 is a flowchart illustrating the processing procedure of the subroutine in step S13 of the first embodiment.

In step S31, processor 201 calculates the size of the maximum void area in at least one void area in read image RG.

In step S32, processor 201 acquires the threshold for size determination corresponding to the image forming condition of image forming unit 204 from threshold table 212 stored in storage 203.

In step S33, processor 201 determines whether the size of the maximum void area is greater than or equal to the threshold for size determination corresponding to the image forming condition of image forming unit 204. In the example of FIG. 9, processor 201 determines whether the size of void area P3 is greater than or equal to the threshold for the size determination corresponding to the image forming condition of image forming unit 204.

When the size of the maximum void area is greater than or equal to the threshold for size determination corresponding to the image forming condition of image forming unit 204 (YES in step S33), processor 201 advances the processing to step S34. On the other hand, when the size of the maximum void area is less than the threshold for size determination corresponding to the image forming condition of image forming unit 204 (NO in step S33), processor 201 advances the processing to step S35.

In step S34, processor 201 determines that the fixing defect is generated. In step S35, processor 201 determines that the fixing defect is not generated. After step S34 or step S35, the processing returns to step S14.

(E5: Determination by Image Density)

Figure 11:
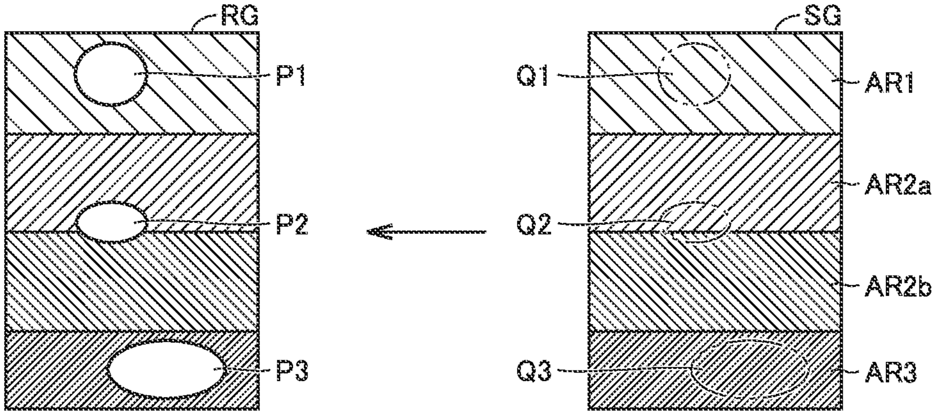
FIG. 11 is a view illustrating a second example of the read image and the reference image of the first embodiment.
Figure 12:
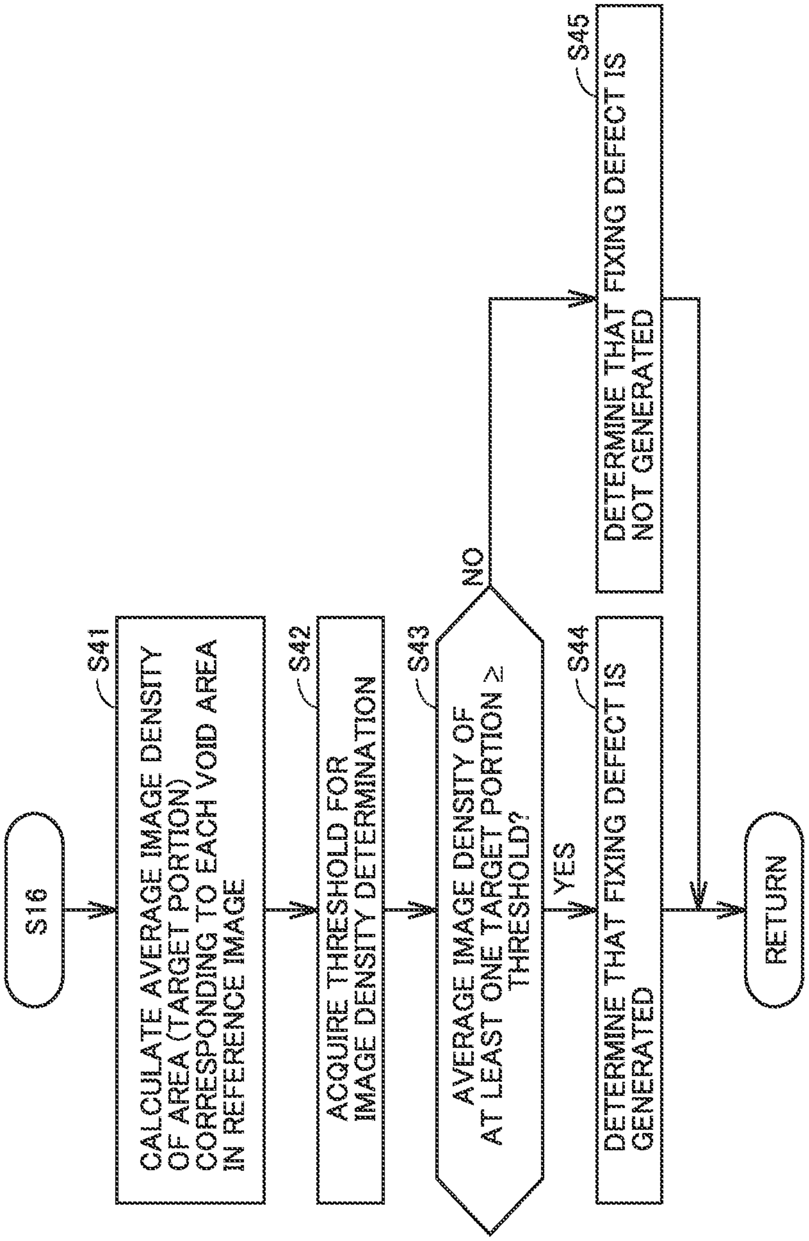
FIG. 12 is a flowchart illustrating a processing procedure of a subroutine in step S16 of the first embodiment.

With reference to FIGS. 11 and 12, details of the determination in step S16 described above, namely, the determination by image density will be described.

FIG. 11 is a view illustrating a second example of the read image and the reference image of the first embodiment. FIG. 11 illustrates read image RG and reference image SG acquired by processor 201 from image inspection device 500 in step S11 described above. In the example of FIG. 11, reference image SG includes four areas having different image densities from each other, namely, an area AR1, an area AR2*a*, an area AR2*b*, and an area AR3.

In the example of FIG. 11, read image RG includes void area P1, void area P2, and void area P3. That is, the image defect due to the void is generated in read image RG. An area Q1, an area Q2, and an area Q3 in reference image SG indicate target portions corresponding to void area P1, void area P2, and void area P3 of read image RG in reference image SG. In the example of FIG. 11, area Q1 belongs to area AR1, area Q2 spans area AR2*a* and area AR2*b*, and area Q3 belongs to area AR3.

The cause of the void is considered to be the fixing defect or the transfer defect. In addition, the fixing defect tends to be generated more easily as the image density is higher.

Accordingly, when the image density of at least one target portion corresponding to at least one defective portion of read image RG in reference image SG is greater than or equal to the threshold for image density determination corresponding to the image forming condition of image forming unit 204, processor 201 determines that the cause of the image defect is the fixing defect. In the first embodiment, "at least one defective portion" in the determination by image density means at least one defective portion among one or more defective portions in read image RG.

In the example of FIG. 11, processor 201 determines that the cause of the image defect is the fixing defect when the image density of at least one of area Q1, area Q2, and area Q3 is greater than or equal to the threshold for image density determination corresponding to the image forming condition of image forming unit 204.

With reference to FIG. 12, a processing procedure of the determination by image density will be described. FIG. 12 is a flowchart illustrating the processing procedure of the subroutine in step S16 of the first embodiment.

In step S41, processor 201 calculates the average image density of the target portion corresponding to each void area of read image RG in reference image SG. In the example of FIG. 11, processor 201 calculates the average image densities of area Q1, area Q2, and area Q3.

When the target portion belongs to one area having the same image density such as area Q1 and area Q3, processor 201 determines the image density of the area to which the target portion belongs as the average image density of the target portion. That is, processor 201 determines the image density of area AR1 as the average image density of area Q1, and determines the image density of area AR3 as the average image density of area Q3.

On the other hand, when the target portion spans at least two areas having different image densities as in area Q2, processor 201 determines the average value of the image densities of the at least two areas as the average image density of the target portion. That is, processor 201 determines the average value of the image densities of area AR2*a* and area AR2*b* as the average image density of area Q2.

In step S42, processor 201 acquires the threshold for image density determination corresponding to the image forming condition of image forming unit 204 from threshold table 212 stored in storage 203.

In step S43, processor 201 determines whether the average image density of at least one target portion in reference image SG is greater than or equal to the threshold for image density determination corresponding to the image forming condition of image forming unit 204. In the example of FIG. 11, processor 201 determines whether the average image density of at least one of area Q1, area Q2, and area Q3 is greater than or equal to the threshold for image density determination corresponding to the image forming condition of image forming unit 204.

When the average image density of at least one target portion in reference image SG is greater than or equal to the threshold for image density determination corresponding to the image forming condition of image forming unit 204 (YES in step S43), processor 201 advances the processing to step S44. On the other hand, when the average image density of any target portion in reference image SG is less than the threshold for image density determination corresponding to the image forming condition of image forming unit 204 (NO in step S43), processor 201 advances the processing to step S45.

In step S44, processor 201 determines that the fixing defect is generated. In step S45, processor 201 determines that the fixing defect is not generated. After step S44 or step S45, the processing returns to step S17.

(E6: Determination by Color)

Figure 13:
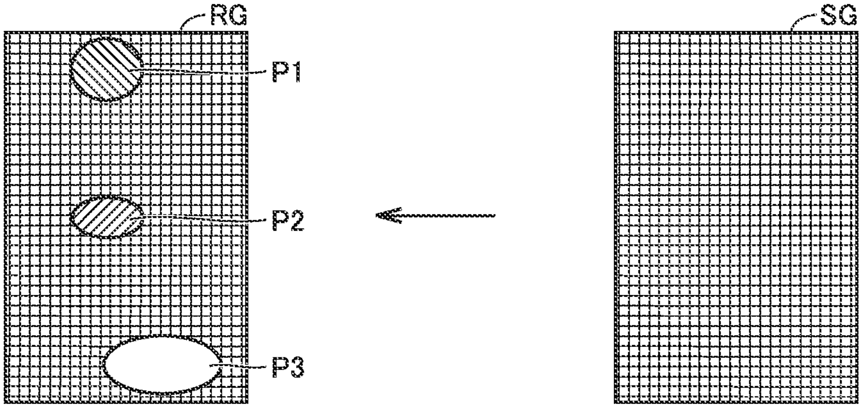
FIG. 13 is a view illustrating a third example of the read image and the reference image of the first embodiment.
Figure 14:
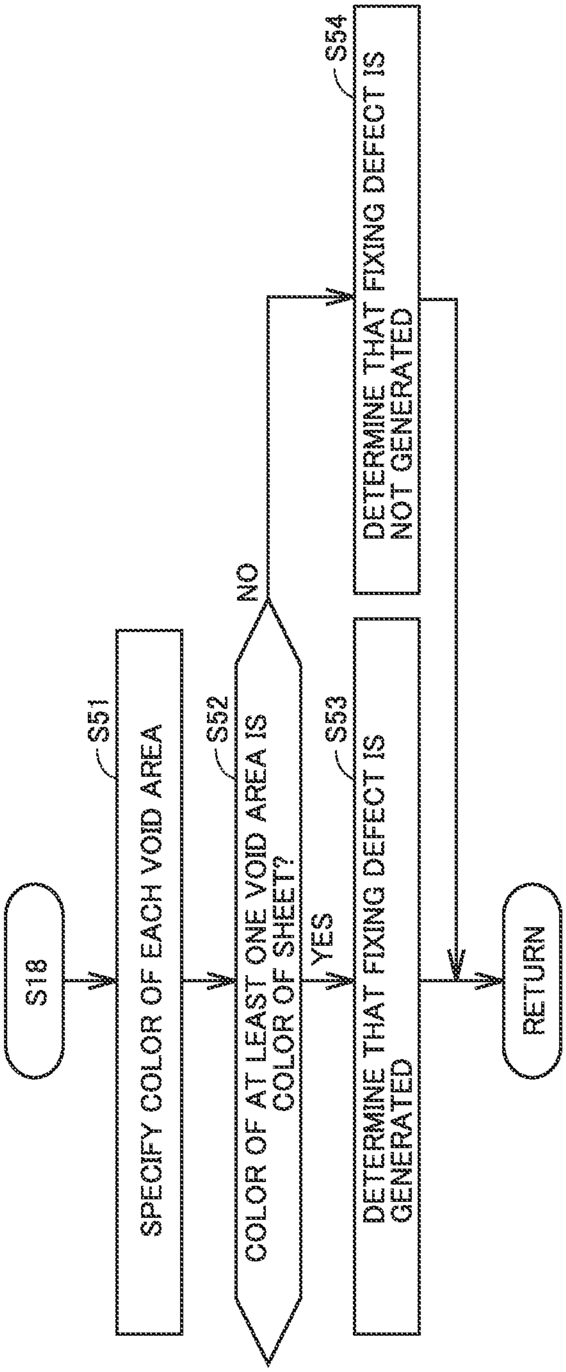
FIG. 14 is a flowchart illustrating a processing procedure of a subroutine in step S18 of the first embodiment.

With reference to FIGS. 13 and 14, details of the determination in step S18 described above, namely, the determination by color will be described.

FIG. 13 is a view illustrating a third example of the read image and the reference image of the first embodiment. FIG. 13 illustrates read image RG and reference image SG acquired by processor 201 from image inspection device 500 in step S11 described above. In the example of FIG. 13, reference image SG is an image in which the same color (for example, green) is applied to the entire surface.

In the example of FIG. 13, read image RG includes void area P1, void area P2, and void area P3. That is, the image defect due to the void is generated in read image RG. In the example of FIG. 13, it is assumed that the color of void area P1 is yellow, the color of void area P2 is cyan, and the color of void area P3 is white. Furthermore, in the example of FIG. 13, it is assumed that the color of sheet SH is white. That is, in the example of FIG. 13, while the colors of void area P1 and void area P2 are different from the color of sheet SH, the color of void area P3 is equal to the color of sheet SH.

The cause of the void is considered to be the fixing defect or the transfer defect. In addition, in the case of the fixing defect, because all the toner transferred to the sheet is peeled off from the sheet, there is a tendency that no toner adheres to the void area. On the other hand, in the case of the transfer defect, the toner of some colors is not transferred to the sheet, and the toner transferred to the sheet is fixed to the sheet by fixing unit 243, so that the toner transferred to the sheet tends to adhere to the void area. Consequently, when the color of the void area is the color of the sheet SH, it can be determined that no toner is attached to the void area, namely, the void is caused by the fixing defect.

Accordingly, when the color of at least one defective portion of read image RG is the color of sheet SH, processor 201 determines that the cause of the image defect is the fixing defect. In the first embodiment, “at least one defective portion” in the determination by color means at least one defective portion among one or more defective portions in read image RG.

In the example of FIG. 13, when the color of at least one of void area P1, void area P2, and void area P3 is the color of sheet SH, processor 201 determines that the cause of the image defect is the fixing defect. In the example of FIG. 13, because the color of void area P3 is equal to the color of sheet SH, processor 201 determines that the cause of the image defect is the fixing defect.

With reference to FIG. 14, the processing procedure of the determination by color will be described. FIG. 14 is a flowchart illustrating the processing procedure of the subroutine in step S18 of the first embodiment.

In step S51, processor 201 specifies the color of each void area in read image RG. In the example of FIG. 13, processor 201 specifies colors of void area P1, void area P2, and void area P3.

In step S52, processor 201 determines whether the color of at least one void area in read image RG is the color of sheet SH. In the example of FIG. 13, processor 201 determines whether the color of at least one void area of void area P1, void area P2, and void area P3 is the color of sheet SH.

When the color of at least one void area in read image RG is the color of sheet SH (YES in step S52), processor 201 advances the processing to step S53. On the other hand, when the color of any void area in read image RG is not the color of sheet SH (NO in step S52), processor 201 advances the processing to step S54.

In step S53, processor 201 determines that the fixing defect is generated. In step S54, processor 201 determines that the fixing defect is not generated. After step S53 or step S54, the processing returns to step S19.

(E7: Determination by Surface Property)

Figure 15:
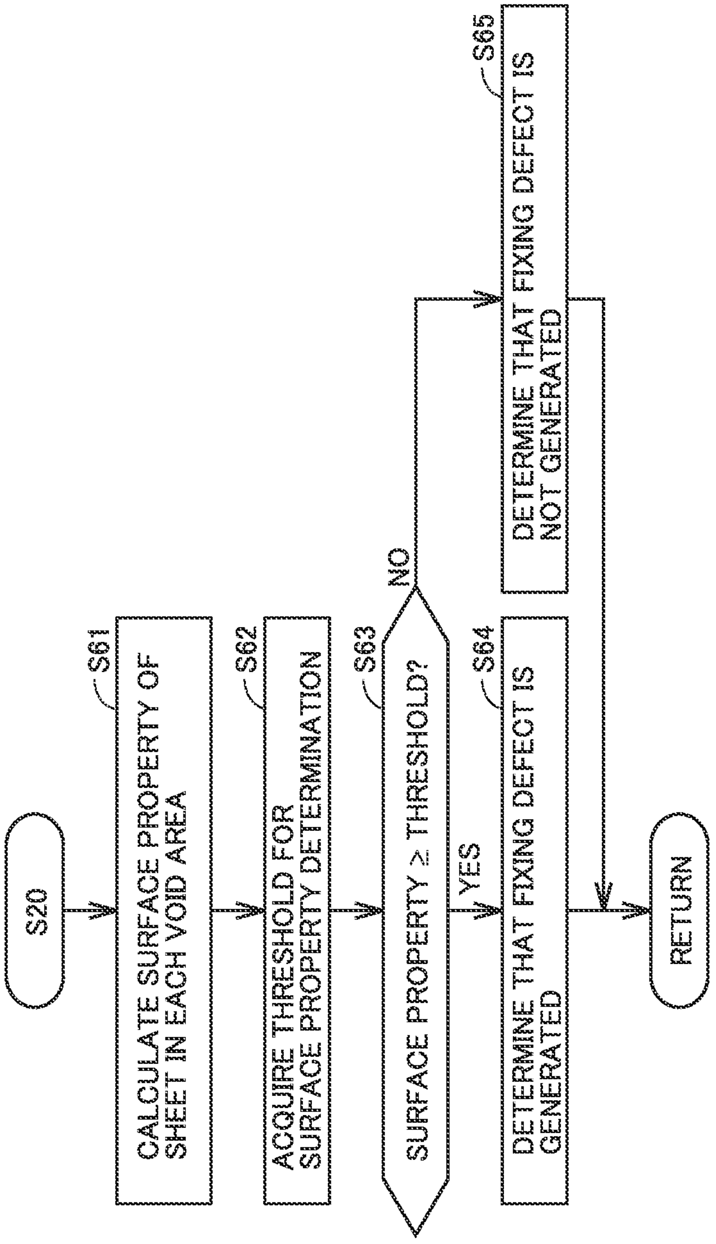
FIG. 15 is a flowchart illustrating a processing procedure of a subroutine in step S20 of the first embodiment.

With reference to FIGS. 9 and 15, details of the determination in step S20 described above, namely, the determination by surface property will be described.

As described above, in the example of FIG. 9, read image RG includes void area P1, void area P2, and void area P3. That is, the image defect due to the void is generated in read image RG.

The cause of the void is considered to be the fixing defect or the transfer defect. In addition, when a vaporization amount of moisture in the sheet during the fixing processing is large, a blister is generated. The blister is a phenomenon in which the moisture vaporized inside the sheet does not completely escape and a bulge on the sheet surface or a crack is generated. Due to such the bulge or the crack of the sheet surface, the toner is likely to be peeled off from the sheet surface, and thus the fixing defect tends to be generated. Consequently, when the bulge or the crack is generated in the sheet surface in the void area of the sheet after the image formation, namely, when the surface property in the void area of the sheet after the image formation is high, it can be determined that the void is caused by the fixing defect.

Accordingly, processor 201 determines that the cause of the image defect is the fixing defect when the surface property of sheet SH in at least one defective portion among one or more defective portions in read image RG is greater than or equal to the threshold for surface property determination corresponding to the image forming condition of image forming unit 204. In the first embodiment, “at least one defective portion” in the determination by surface property means at least one defective portion among one or more defective portions in read image RG.

In the example of FIG. 9, processor 201 determines that the cause of the image defect is the fixing defect when the surface property of sheet SH in at least one of void area P1, void area P2, and void area P3 is greater than or equal to the threshold for surface property determination corresponding to the image forming condition of image forming unit 204.

With reference to FIG. 15, the processing procedure of the determination by surface property will be described. FIG. 15 is a flowchart illustrating the processing procedure of the subroutine in step S20 of the first embodiment.

In step S61, processor 201 calculates the surface property of sheet SH in each void area of read image RG based on the information indicating the surface property of sheet SH included in the inspection result received from image inspection device 500. As an example, the information indicating the surface property of sheet SH included in the inspection result is information indicating a light scattering degree on the surface of sheet SH. Processor 201 calculates the surface property of sheet SH in the void area based on the light scattering degree in the void area and the light scattering degree in the area other than the void area (that is, the normal area where the image defect is not generated). The surface property in the void area of sheet SH after image formation is calculated by the processing of step S61.

In step S62, processor 201 acquires the threshold for surface property determination corresponding to the image forming condition of image forming unit 204 from threshold table 212 stored in storage 203.

In step S63, processor 201 determines whether the surface property of sheet SH in at least one void area in read image RG is greater than or equal to the threshold for surface property determination corresponding to the image forming condition of image forming unit 204. In the example of FIG. 9, processor 201 determines whether the surface property of sheet SH in at least one void area of void area P1, void area P2, and void area P3 is greater than or equal to the threshold for surface property determination corresponding to the image forming condition of image forming unit 204.

When the surface property of sheet SH in at least one void area in read image RG is greater than or equal to the threshold for surface property determination corresponding to the image forming condition of image forming unit 204 (YES in step S63), processor 201 advances the processing to step S64. On the other hand, when the surface property of sheet SH is less than the threshold for surface property determination corresponding to the image forming condition of image forming unit 204 in any void area in read image RG (NO in step S63), processor 201 advances the processing to step S65.

In step S64, processor 201 determines that the fixing defect is generated. In step S65, processor 201 determines that the fixing defect is not generated. After step S64 or step S65, the processing returns to step S21.

(E8: Determination by Toner Stain)

Figure 16:
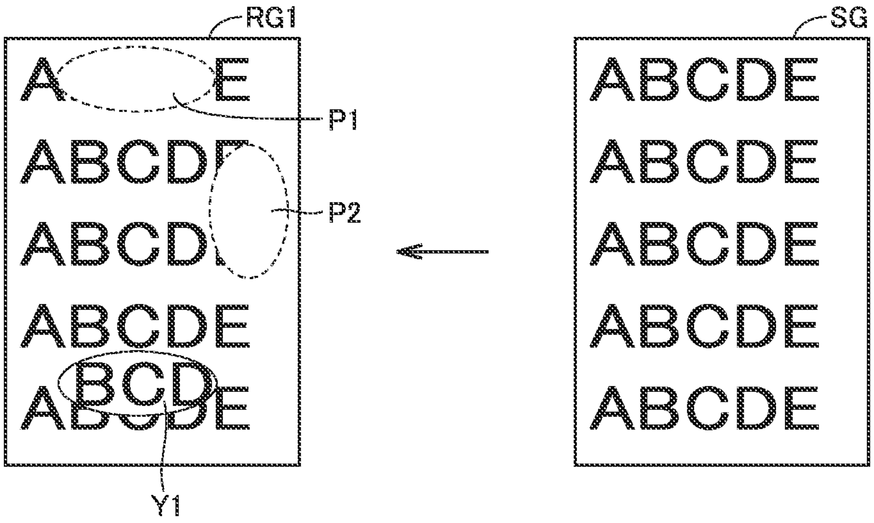
FIG. 16 is a view illustrating a fourth example of the read image and the reference image of the first embodiment.
Figure 17:
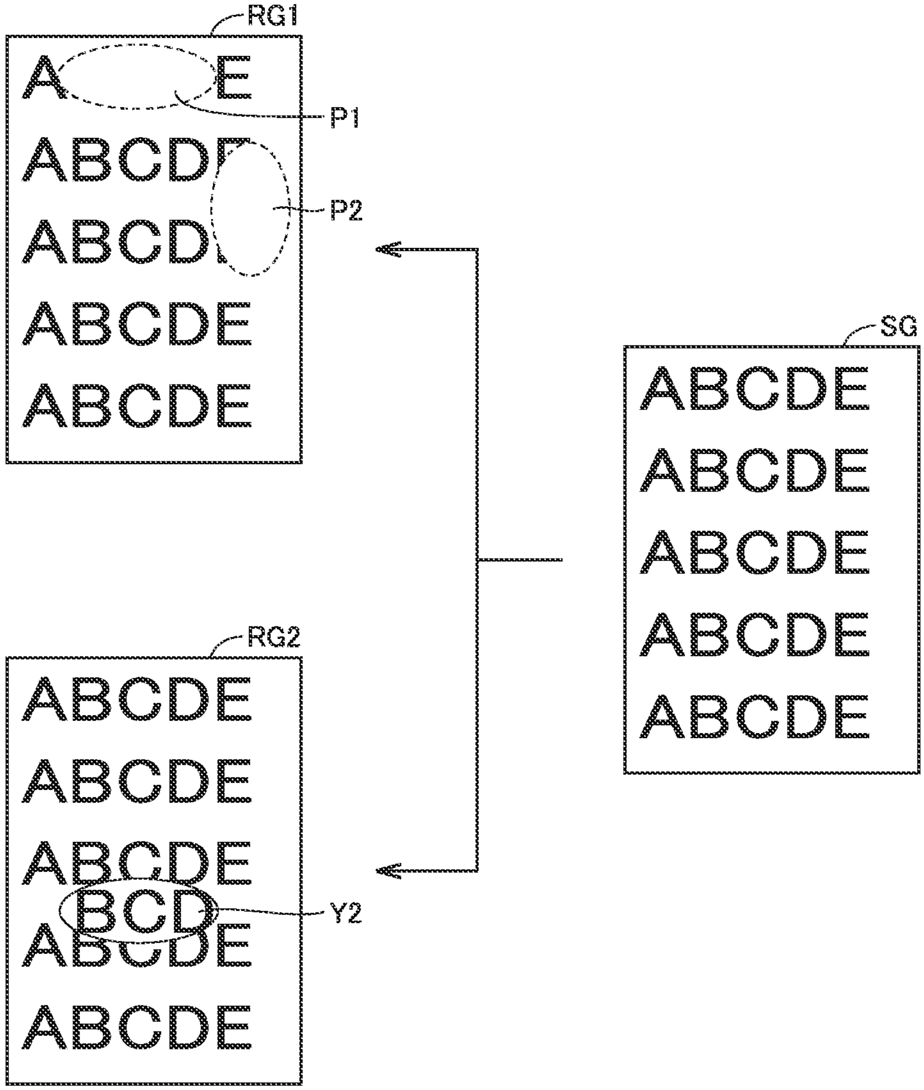
FIG. 17 is a view illustrating a fifth example of the read image and the reference image of the first embodiment.
Figure 18:
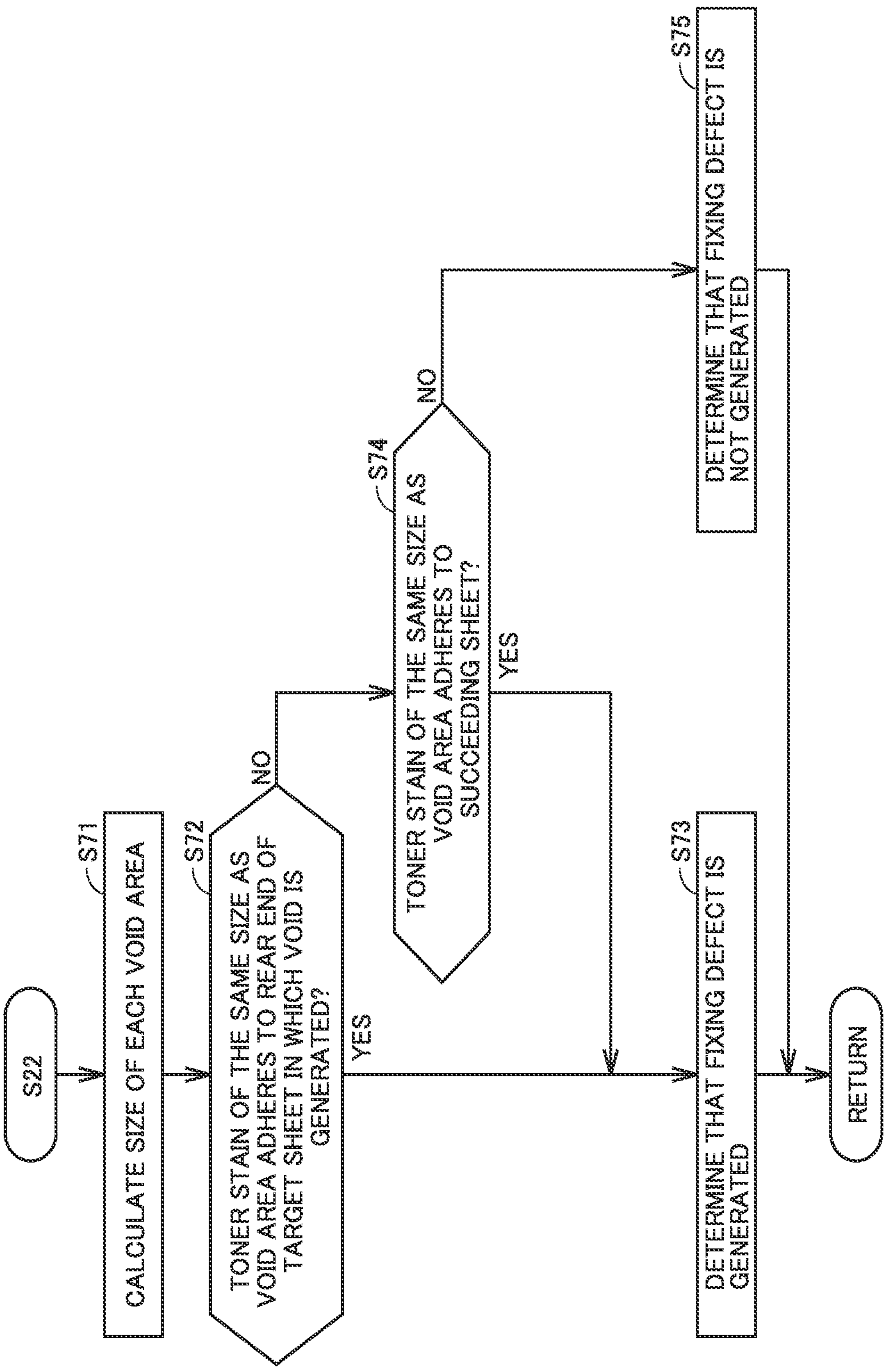
FIG. 18 is a flowchart illustrating a processing procedure of a subroutine in step S22 of the first embodiment.

With reference to FIGS. 16 to 18, details of the determination in step S22 described above, namely, the determination by toner stain will be described. In the following description of the determination by toner stain, the sheet on which the image defect due to the void is caused is referred to as "target sheet", and the sheet following the target sheet is referred to as "succeeding sheet".

FIG. 16 is a view illustrating a fourth example of the read image and the reference image of the first embodiment. FIG. 16 illustrates a read image RG1 and reference image SG acquired by processor 201 from image inspection device 500 in step S11 described above. Read image RG1 is an image obtained by imaging sensor 504 scanning the target sheet.

In the example of FIG. 16, read image RG1 includes void area P1 and void area P2. That is, the image defect due to the void is generated in read image RG1. In the example of FIG. 16, read image RG1 includes toner stain Y1 having the same size as void area P1.

FIG. 17 is a view illustrating a fifth example of the read image and the reference image of the first embodiment. FIG. 17 illustrates read image RG1 of the target sheet, a read image RG2 of the succeeding sheet, and reference image SG acquired by processor 201 from image inspection device 500 in step S11 described above. Read image RG1 is an image obtained by imaging sensor 504 scanning the target sheet, and read image RG2 is an image obtained by imaging sensor 504 scanning the succeeding sheet.

In the example of FIG. 17, read image RG1 includes void area P1 and void area P2. That is, the image defect due to the void is generated in read image RG1. In the example of FIG. 17, read image RG1 does not include the toner stain, but read image RG2 includes toner stain Y2 having the same size as void area P1.

The cause of the void is considered to be the fixing defect or the transfer defect. In addition, in the case of the fixing defect, the toner peeled off from the sheet adheres to fixing belt 245. Because fixing belt 245 circulates, the toner that is peeled off from the sheet and attached to fixing belt 245 can be attached to at least one of the rear end of the target sheet and the succeeding sheet. Consequently, when the toner stain of the same size as the void area adheres to at least one of the rear end of the target sheet and the succeeding sheet, it can be determined that the fixing defect is generated.

Accordingly, processor 201 determines that the cause of the image defect is the fixing defect when the toner stain having the same size as at least one defective portion of read image RG1 adheres to at least one of the target sheet and the succeeding sheet. In the first embodiment, "at least one defective portion" in the determination by toner stain means at least one defective portion among one or more defective portions in read image RG1.

In the example of FIGS. 16 and 17, processor 201 determines that the cause of the image defect is the fixing defect when the toner stain having the same size as at least one of void area P1 and void area P2 adheres to at least one of the target sheet and the succeeding sheet. In the example of FIG. 16, because toner stain Y1 having the same size as void area P1 adheres to the target sheet, processor 201 determines that the cause of the image defect is the fixing defect. In the example of FIG. 17, because toner stain Y2 having the same size as void area P1 adheres to the succeeding sheet, processor 201 determines that the cause of the image defect is the fixing defect.

Also in the case where the toner stain of the same size as the void area adheres to both the target sheet and the succeeding sheet, processor 201 determines that the cause of the image defect is the fixing defect.

With reference to FIG. 18, the processing procedure of the determination by toner stain will be described. FIG. 18 is a flowchart illustrating the processing procedure of the subroutine in step S22 of the first embodiment.

In step S71, processor 201 calculates the size of each void area in the read image.

In step S72, processor 201 determines whether the toner stain of the same size as at least one void area adheres to the rear end of the target sheet in which at least one void is generated. In the example of FIG. 16, processor 201 determines whether the toner stain of the same size as at least one void area of void area P1 and void area P2 adheres to the rear end of the target sheet.

When the toner stain of the same size as at least one void area adheres to the rear end of the target sheet where at least one void is generated (YES in step S72), processor 201 advances the processing to step S73. On the other hand, when the toner stain does not adhere to the rear end of the target sheet where at least one void is generated, or when the size of the toner stain is not matched with the size of any void area even when the toner stain adheres (NO in step S72), processor 201 advances the processing to step S74.

In step S74, processor 201 determines whether the toner stain of the same size as at least one void area on the target sheet adheres to the succeeding sheet. In the example of FIG. 17, processor 201 determines whether the toner stain of the same size as at least one void area of void area P1 and void area P2 adheres to the succeeding sheet.

When the toner stain of the same size as at least one void area on the target sheet adheres to the succeeding sheet (YES in step S74), processor 201 advances the processing to step S73. On the other hand, when the toner stain does not adhere to the succeeding sheet, or when the size of the toner stain is not matched with the size of any void area on the target sheet even when the toner stain adheres to the succeeding sheet (NO in step S74), processor 201 advances the processing to step S75.

In step S73, processor 201 determines that the fixing defect is generated. In step S75, processor 201 determines that the fixing defect is not generated. After step S73 or step S75, the processing returns to step S23.

(E9: Processing Procedure of Feedback Control)

Figure 19:
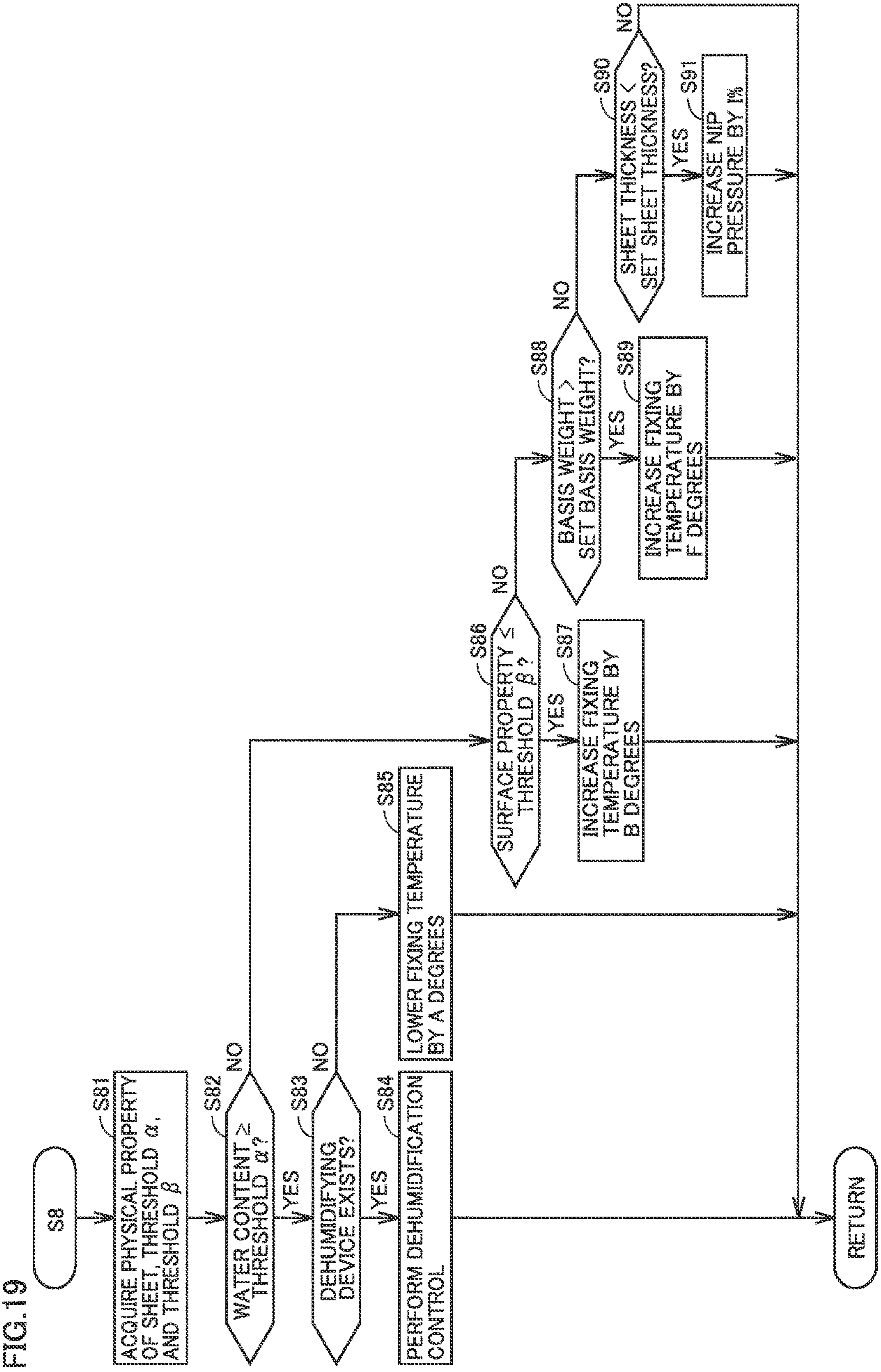
FIG. 19 is a flowchart illustrating a processing procedure of a subroutine in step S8 of the first embodiment.

With reference to FIG. 19, the processing procedure of the feedback control in step S8 will be described. FIG. 19 is a flowchart illustrating the processing procedure of the subroutine in step S8 of the first embodiment. The processing in FIG. 19 is processing performed by feedback control unit 250 described above, namely, processor 201.

In step S81, processor 201 acquires the physical property of sheet SH for which it is determined that the cause of the image defect is the fixing defect, a threshold α corresponding to the image forming condition of image forming unit 204, and a threshold β corresponding to the image forming condition of image forming unit 204 from storage 203. The physical property of sheet SH is detected by media sensor 400 before the image formation, and stored in storage 203. Threshold α is a threshold of the water content of the sheet. Threshold β is a threshold of the surface property of the sheet. Threshold α and threshold rare included in threshold table 213.

In step S82, processor 201 determines whether the water content of sheet SH is greater than or equal to threshold α corresponding to the image forming condition of image forming unit 204. The water content of sheet SH is one of the physical properties of sheet SH acquired from storage 203 in step S81.

When the water content of sheet SH is greater than or equal to threshold α corresponding to the image forming condition of image forming unit 204 (YES in step S82), processor 201 advances the processing to step S83. On the other hand, when the water content of sheet SH is less than threshold α corresponding to the image forming condition of image forming unit 204 (NO in step S82), processor 201 advances the processing to step S86.

In step S83, processor 201 determines whether dehumidifying device 302 exists. When dehumidifying device 302 exists (YES in step S83), processor 201 advances the processing to step S84. On the other hand, when dehumidifying device 302 does not exist (NO in step S83), processor 201 advances the processing to step S85.

In step S84, processor 201 performs the dehumidification control by dehumidifying device 302 as the feedback control. In general, when the water content of the sheet is high, the blister is likely to be generated during the fixing processing, and thus the toner tends to be difficult to fix to the sheet. However, because the dehumidification control is performed to dehumidify the sheet fed from sheet feeder 300, the generation of the blister during the fixing processing is prevented. Consequently, the generation of the fixing defect is also prevented.

In step S85, processor 201 lowers the fixing temperature by A degrees as the feedback control. The vaporization amount of moisture in the sheet during the fixing processing is prevented by lowering the fixing temperature, so that the generation of the blister is prevented. Consequently, the generation of the fixing defect is also prevented.

When the performance of the dehumidification control is not set although dehumidifying device 302 exist, processor 201 may lower the fixing temperature by A degrees without performing the dehumidification control as the feedback control in step S84. Accordingly, the dehumidification control is not performed, so that a decrease in productivity can be prevented.

In step S86, processor 201 determines whether the surface property of sheet SH is less than or equal to threshold β corresponding to the image forming condition of image forming unit 204. The surface property of sheet SH is one of the physical properties of sheet SH acquired from storage 203 in step S81.

When the surface property of sheet SH is less than or equal to threshold β corresponding to the image forming condition of image forming unit 204 (YES in step S86), processor 201 advances the processing to step S87. On the other hand, when the surface property of sheet SH is greater than threshold β corresponding to the image forming condition of image forming unit 204 (NO in step S86), processor 201 advances the processing to step S88.

In step S87, processor 201 increases the fixing temperature by B degrees as the feedback control. In general, when the image is formed on the sheet having a smooth surface, namely, the sheet having the low surface property, the toner tends to be difficult to fix to the sheet. However, more heat is applied to the sheet by increasing the fixing temperature, so that stronger fixability can be secured. Consequently, the generation of the fixing defect is prevented.

In step S87, processor 201 may execute any one of widening the inter-sheet distance by C %, decreasing the fixing speed by D %, and increasing the nip pressure by E % as the feedback control instead of increasing the fixing temperature by B degrees. More heat is applied to the sheet by any of widening the inter-sheet distance by C %, decreasing the fixing speed by D %, and increasing the nip pressure by E %, so that stronger fixability can be secured. Consequently, the generation of the fixing defect is prevented.

In step S88, processor 201 determines whether the basis weight of sheet SH exceeds the set basis weight. The basis weight of sheet SH is one of physical properties of sheet SH acquired from storage 203 in step S81. The set basis weight is included in the image forming condition received from controller 100.

When the basis weight of sheet SH exceeds the set basis weight (YES in step S88), processor 201 advances the processing to step S89. On the other hand, when the basis weight of sheet SH does not exceed the set basis weight (NO in step S88), processor 201 advances the processing to step S90.

In step S89, processor 201 increases the fixing temperature by F degrees as the feedback control. In general, the case where the basis weight of sheet SH detected by media sensor 400 exceeds the set basis weight is equal to the case where a thick sheet is passed with the thin sheet setting, and thus the toner tends to be difficult to be fixed to the sheet due to insufficient fixing temperature. However, more heat is applied to the sheet by increasing the fixing temperature, so that stronger fixability can be secured. Consequently, the generation of the fixing defect is prevented.

In step S89, processor 201 may perform either widening the inter-sheet distance by G % or decreasing the fixing speed by H % as the feedback control instead of increasing the fixing temperature by F degrees. More heat is applied to the sheet by both widening the inter-sheet distance by G % and decreasing the fixing speed by H %, so that stronger fixability can be secured. Consequently, the generation of the fixing defect is prevented.

In step S90, processor 201 determines whether the sheet thickness of sheet SH is less than the set sheet thickness. The sheet thickness of sheet SH is one of the physical properties of sheet SH acquired from storage 203 in step S81. The set sheet thickness is included in the image forming condition received from controller 100.

When the sheet thickness of sheet SH is less than the set sheet thickness (YES in step S90), processor 201 advances the processing to step S91. On the other hand, when the sheet thickness of sheet SH is greater than or equal to the set sheet thickness (NO in step S90), the processing returns to step S9.

In step S91, processor 201 increases the nip pressure by 1% as feedback control. In general, the case where the sheet thickness of sheet SH detected by media sensor 400 is less than the set sheet thickness is equal to the case where the thin sheet is passed with the thick sheet setting, and thus the toner tends to be difficult to be fixed to the sheet due to insufficient nip pressure. However, more pressure is applied to the sheet by increasing the nip pressure, so that stronger fixability can be secured. Consequently, the generation of the fixing defect is prevented.

After step S84, step S85, step S87, step S89, or step S91, the processing returns to step S9.

Above-described A degree, B degree. C %, D %, E %, F degree, G %, H %, and I % are previously determined by experiments or the like.

(E10: Sheet to which Feedback Control is Applied)

Figure 20:
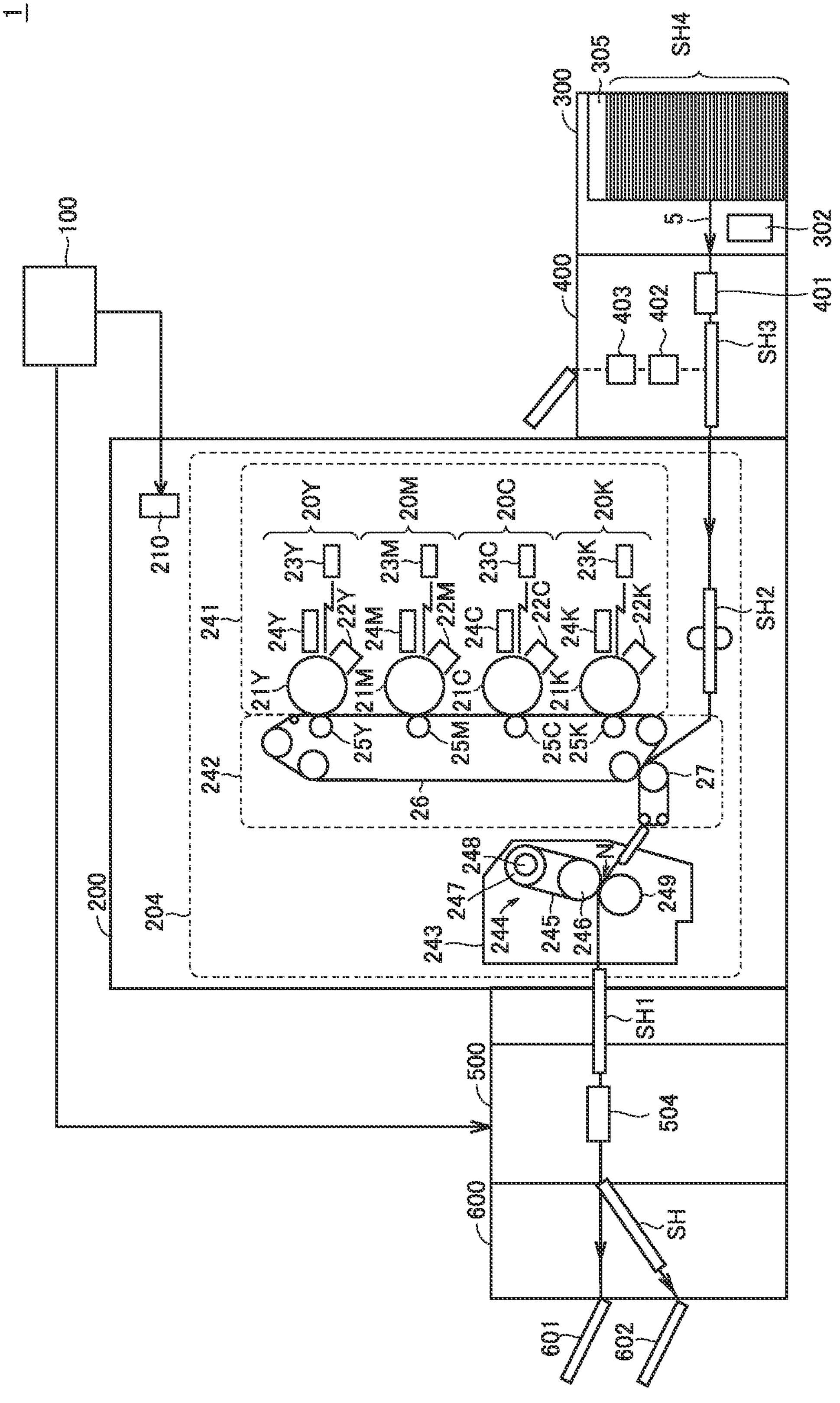
FIG. 20 is a view illustrating a sheet to which feedback control of the first embodiment is applied.

With reference to FIG. 20, the sheet to which the feedback control is applied will be described. FIG. 20 is a view illustrating the sheet to which the feedback control of the first embodiment is applied. The sheet to which the feedback control is applied is determined by feedback control unit 250 described above, namely, processor 201.

Sheet SH in FIG. 20 is the sheet for which determination unit 252 determines that the cause of the image defect is the fixing defect.

When the feedback control is the change of the fixing condition, the feedback control is applied to the sheet on which the fixing processing is performed after determination unit 252 determines that the cause of the image defect is the fixing defect, namely, a sheet SH2, a sheet SH3, and a sheet SH4.

Particularly, the feedback control is applied to the sheet on which the sheet feeding conveyance is not started at the time when determination unit 252 determines that the cause of the image defect is the fixing defect, namely, sheet SH4. In addition, the feedback control is applied to, for example, sheet SH2 and sheet SH3 when the fixing processing is not performed on the sheet in which the sheet feeding conveyance is started at the time when determination unit 252 determines that the cause of the image defect is the fixing defect and when the fixing condition is changed in time.

On the other hand, when the feedback control is the dehumidification control by dehumidifying device 302, the feedback control is applied to the sheet on which the sheet feeding conveyance is not started at the time when determination unit 252 determines that the cause of the image defect is the fixing defect, namely, sheet SH4.

In addition, when the feedback control is the dehumidification control by dehumidifying device 302, the feedback control is applied to the sheet that can be applied with the dehumidification control even when the sheet feeding conveyance is started at the time when determination unit 252 determines that the cause of the image defect is the fixing defect.

The feedback control is not applied to the sheet on which the fixing processing is already performed at the time when determination unit 252 determines that the cause of the image defect is the fixing defect such as sheet SH1.

<F: Advantage in First Embodiment 22

As described above, image forming system 1 of the first embodiment includes image forming unit 204 that forms the image on sheet SH based on the printing data, image inspection unit 551 that inspects the image formed by image forming unit 204, and determination unit 252 that determines whether the cause of the image defect is the fixing defect when the image defect is found by image inspection unit 551. Consequently, the trouble of the user to investigate the cause of the image defect can be prevented, and the cause of the image defect can be investigated without being affected by the experience value of the user.

Image forming system 1 of the first embodiment further includes media sensor 400 that detects the physical property of sheet SH, and feedback control unit 250 that performs the feedback control based on the physical property of sheet SH when determination unit 252 determines that the cause of the image defect is the fixing defect. Consequently, the appropriate feedback control can be performed without being affected by an experience value of the user, and the trouble of adjustment by the user to eliminate the cause of the image defect can be prevented.

In addition, because the feedback control is performed when the cause of the image defect is the fixing defect, the generation of the fixing defect for the sheet on which the fixing processing is performed after it is determined that the cause of the image defect is the fixing defect.

Image forming system 1 of the first embodiment may include at least image forming unit 204, image inspection unit 551, and determination unit 252. Accordingly, image forming system 1 of the first embodiment may not include media sensor 400 and feedback control unit 250. Image forming system 1 of the first embodiment may not include dehumidifying device 302.

In addition, the determination processing may include at least one of the determination by size, the determination by image density, the determination by color, the determination by surface property, and the determination by toner stain.

When the determination processing does not include the determination by size, processor 201 advances the processing to step S16 after step S12.

When the determination processing does not include the determination by image density, processor 201 advances the processing to step S18 in response to the fact that the fixing defect is not generated (NO in step S14).

When the determination processing does not include the determination by color, processor 201 advances the processing to step S20 in response to the fact that the fixing defect is not generated (NO in step S17).

When the determination processing does not include the determination by surface property, processor 201 advances the processing to step S22 in response to the fact that the fixing defect is not generated (NO in step S19).

When the determination process does not include the determination by toner stain, processor 201 advances the processing to step S24 in response to the fact that the fixing defect is not generated (NO in step S21).

The physical property of sheet SH detected by media sensor 400 may include at least one of the water content, the surface property, the basis weight, and the sheet thickness of sheet SH.

When the physical property of sheet SH detected by media sensor 400 does not include the water content, processor 201 advances the processing to step S86 after step S81.

When the physical property of sheet SH detected by media sensor 400 does not include the surface property, processor 201 advances the processing to step S88 in response to the fact that the water content of sheet SH is less than threshold α corresponding to the image forming condition of image forming unit 204 (NO in step S82).

When the physical property of sheet SH detected by media sensor 400 does not include the basis weight, processor 201 advances the processing to step S90 in response to the fact that the surface property of sheet SH is higher than threshold (corresponding to the image forming condition of image forming unit 204 (NO in step S86).

Furthermore, when the physical property of sheet SH detected by media sensor 400 does not include the sheet thickness, the processing returns to step S9 in response to the fact that the basis weight of sheet SH does not exceed the set basis weight (NO in step S88).

Second Embodiment

Because an image forming system according to a second embodiment has a hardware configuration similar to that of image forming system 1 of the first embodiment, the same components are denoted by the same reference numerals, and the description thereof will not be repeated. Image forming system 1 of the second embodiment differs from image forming system 1 of the first embodiment with respect to the determination processing by determination unit 252 and the threshold included in threshold table 212.

In the second embodiment, determination unit 252 determines whether the cause of the image defect is the fixing defect based on the read image and the physical property of sheet SH detected by the media sensor.

Threshold table 212 of the second embodiment includes a threshold used for determination by resistance value, a threshold used for determination by water content, and a threshold used for determination by surface property for each image forming condition. The determination by resistance value, the determination by water content, and the determination by surface property will be described later. In the second embodiment, the threshold used for the determination by resistance value includes a threshold for size determination and a threshold for resistance value determination. In the second embodiment, the threshold used for the determination by water content is referred to as "threshold for water content determination", and the threshold used for the determination by surface property is referred to as "threshold for surface property determination".

Herein after, the determination processing different from that of the first embodiment will be described. Because processing other than the determination processing by determination unit 252 is the same between image forming system 1 of the second embodiment and image forming system 1 of the first embodiment, the description thereof will not be repeated.

Figure 21:
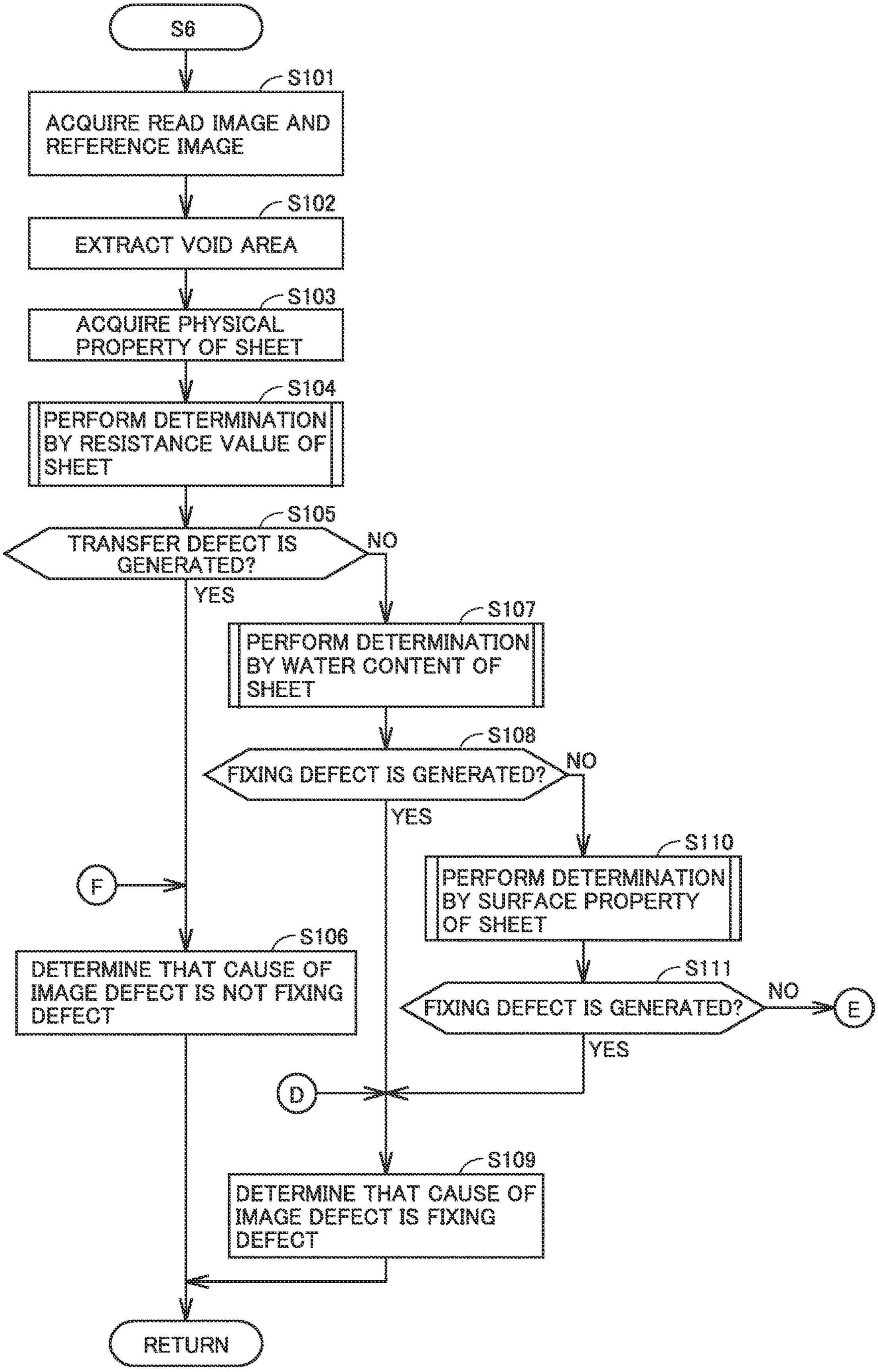
FIG. 21 is a flowchart illustrating a part of a processing procedure of a subroutine in step S6 according to a second embodiment.
Figure 22:
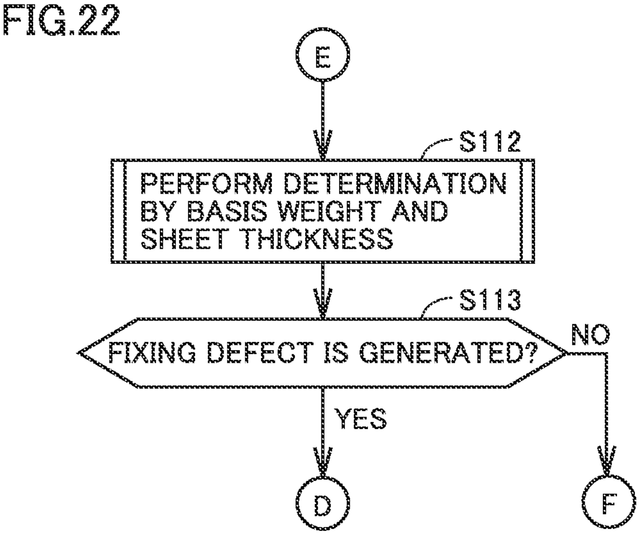
FIG. 22 is a flowchart illustrating another part of the processing procedure of the subroutine in step S6 of the second embodiment.

With reference to FIGS. 21 and 22, the procedure of the determination processing in step S6 will be described. FIG. 21 is a flowchart illustrating a part of the processing procedure of the subroutine in step S6 of the second embodiment. FIG. 22 is a flowchart illustrating another part of the processing procedure of the subroutine in step S6 of the second embodiment. The determination processing in FIGS. 21 and 22 is the processing performed by above-described determination unit 252, namely, processor 201. The determination processing in FIGS. 21 and 22 is started when image inspection device 500 determines that the image defect due to the void exists.

In step S101, processor 201 acquires the read image and the reference image from image inspection device 500.

In step S102, processor 201 extracts the void area in the read image. The processing of step S102 is the same as the processing of step S12 described above. The void area extracted in step S102 indicates the void area in the image formed by image forming unit 204.

In step S103, processor 201 acquires the physical property of sheet SH of which the cause of the image defect is determined to be the fixing defect from storage 203. The physical property of sheet SH is detected by media sensor 400 before the image formation, and stored in storage 203.

In step S104, processor 201 performs determination by a resistance value of sheet SH. In the second embodiment, the determination in step S104 is referred to as "determination by resistance value".

In step S105, processor 201 determines whether the transfer defect is generated. When the transfer defect is generated (YES in step S105), processor 201 advances the processing to step S106. On the other hand, when the transfer defect is not generated (NO in step S105), processor 201 advances the processing to step S107.

In step S106, processor 201 determines that the cause of the image defect is not the fixing defect.

In step S107, processor 201 performs determination by a water content of sheet SH. In the second embodiment, the determination in step S107 is referred to as "determination by water content".

In step S108, processor 201 determines whether the fixing defect is generated. When the fixing defect is generated (YES in step S108), processor 201 advances the processing to step S109. On the other hand, when the fixing defect is not generated (NO in step S108), processor 201 advances the processing to step S110.

In step S109, processor 201 determines that the cause of the image defect is the fixing defect.

In step S110, processor 201 performs determination by a surface property of sheet SH. In the second embodiment, the determination in step S110 is referred to as "determination by surface property".

In step S111, processor 201 determines whether the fixing defect is generated. When the fixing defect is generated (YES in step S111), processor 201 advances the processing to step S109. On the other hand, when the fixing defect is not generated (NO in step S111), processor 201 advances the processing to step S112.

In step S112, processor 201 performs determination by a basis weight and a sheet thickness of sheet SH. In the second embodiment, the determination in step S112 is referred to as "determination by basis weight and sheet thickness".

In step S113, processor 201 determines whether the fixing defect is generated. When the fixing defect is generated (YES in step S113), processor 201 advances the processing to step S109. On the other hand, when the fixing defect is not generated (NO in step S113), processor 201 advances the processing to step S106.

After step S106 or step S109, the processing returns to step S7.

Figure 23:
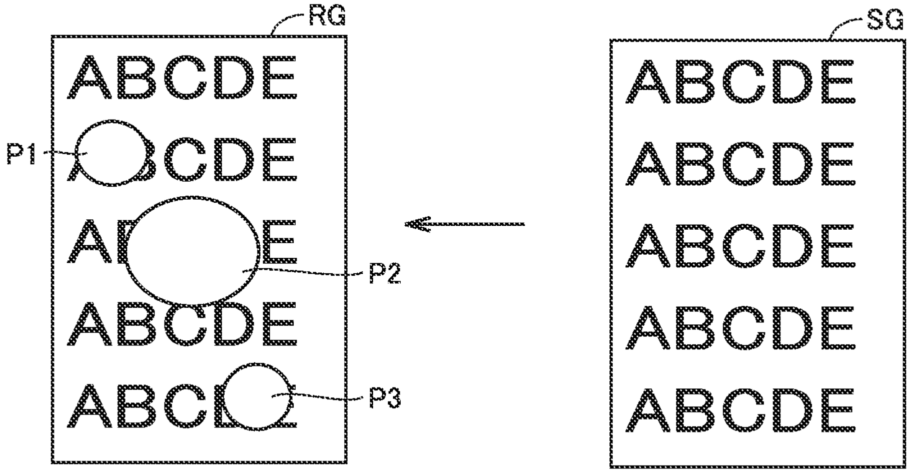
FIG. 23 is a view illustrating an example of the read image and the reference image of the second embodiment.

With reference to FIGS. 23 to 27, the determination by resistance value, the determination by water content, the determination by surface property, and the determination by basis weight and sheet thickness will be described. FIG. 23 is a view illustrating an example of the read image and the reference image of the second embodiment.

FIG. 23 illustrates the example of read image RG and reference image SG acquired by processor 201 from image inspection device 500 in step S101 described above.

In the example of FIG. 23, read image RG includes void area P1, void area P2, and void area P3. That is, the image defect due to the void is generated in read image RG.

The cause of the void is considered to be the fixing defect or the transfer defect. When the resistance value of the sheet is small and the sheet width is also small, discharge is easily generated in the sheet, so that secondary transfer defect tends to be easily generated. The secondary transfer defect is the defect in secondary transfer by transfer unit 242. In addition, the size of the void due to the fixing defect tends to be larger than that of the void due to the transfer defect. In addition, when the water content of the sheet is high, the blister is likely to be generated, so that the fixing defect tends to be generated. In addition, when the image is formed on the sheet having a slippery surface, namely, the sheet having the low surface property, the fixing defect tends to be easily generated. In addition, when a difference is greater than or equal to a first predetermined value between the basis weight of the sheet and the set basis weight, the fixing defect tends to be easily generated. In addition, when a difference is greater than or equal to a second predetermined value between the sheet thickness of the sheet and the set sheet thickness, the fixing defect tends to be easily generated.

Accordingly, processor 201 executes the pieces of processing in FIGS. 24 to 27 to determine whether the cause of the image defect is the fixing defect.

Figure 24:
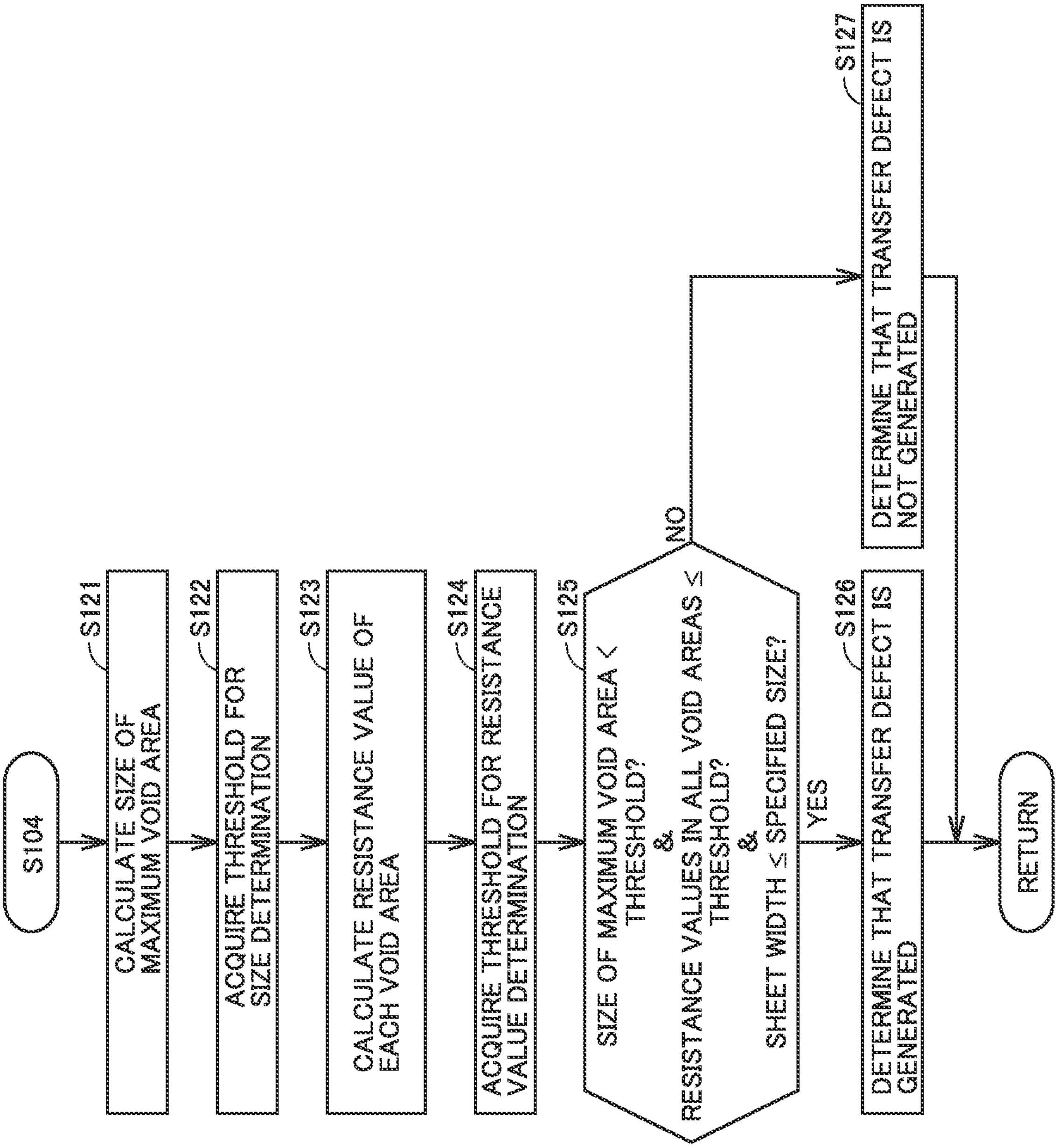
FIG. 24 is a flowchart illustrating a processing procedure of a subroutine in step S104 of the second embodiment.

With reference to FIG. 24, the processing procedure of the determination by resistance value will be described. FIG. 24 is a flowchart illustrating the processing procedure of the subroutine in step S104 of the second embodiment.

In step S121, processor 201 calculates the size of the maximum void area in at least one void area in read image RG.

In step S122, processor 201 acquires the threshold for size determination corresponding to the image forming condition of image forming unit 204 from threshold table 212 stored in storage 203.

In step S123, processor 201 calculates the resistance value of sheet SH in each void area based on the physical property of sheet SH acquired in step S103.

In the example of FIG. 23, processor 201 calculates the resistance value of sheet SH for each of void area P1, void area P2, and void area P3. When a certain void area, for example, void area P2 spans at least two areas having different resistance values, processor 201 determines an average value of the resistance values in the at least two areas as the resistance value of void area P2.

In step S124, processor 201 acquires the threshold for resistance value determination corresponding to the image forming condition of image forming unit 204 from threshold table 212 stored in storage 203.

In step S125, processor 201 determines whether all three conditions are satisfied, namely, the size of the maximum void area is less than the threshold for size determination, the resistance value is less than or equal to the threshold for resistance value determination in all void areas, and the width of sheet SH is less than or equal to the specified size. When all the three conditions are satisfied (YES in step S125), processor 201 advances the processing to step S126. On the other hand, when at least one of the three conditions is not satisfied (NO in step S125), processor 201 advances the processing to step S127.

In step S126, processor 201 determines that the transfer defect is generated. In step S127, processor 201 determines that the transfer defect is not generated. After step S126 or step S127, the processing returns to step S105.

Figure 25:
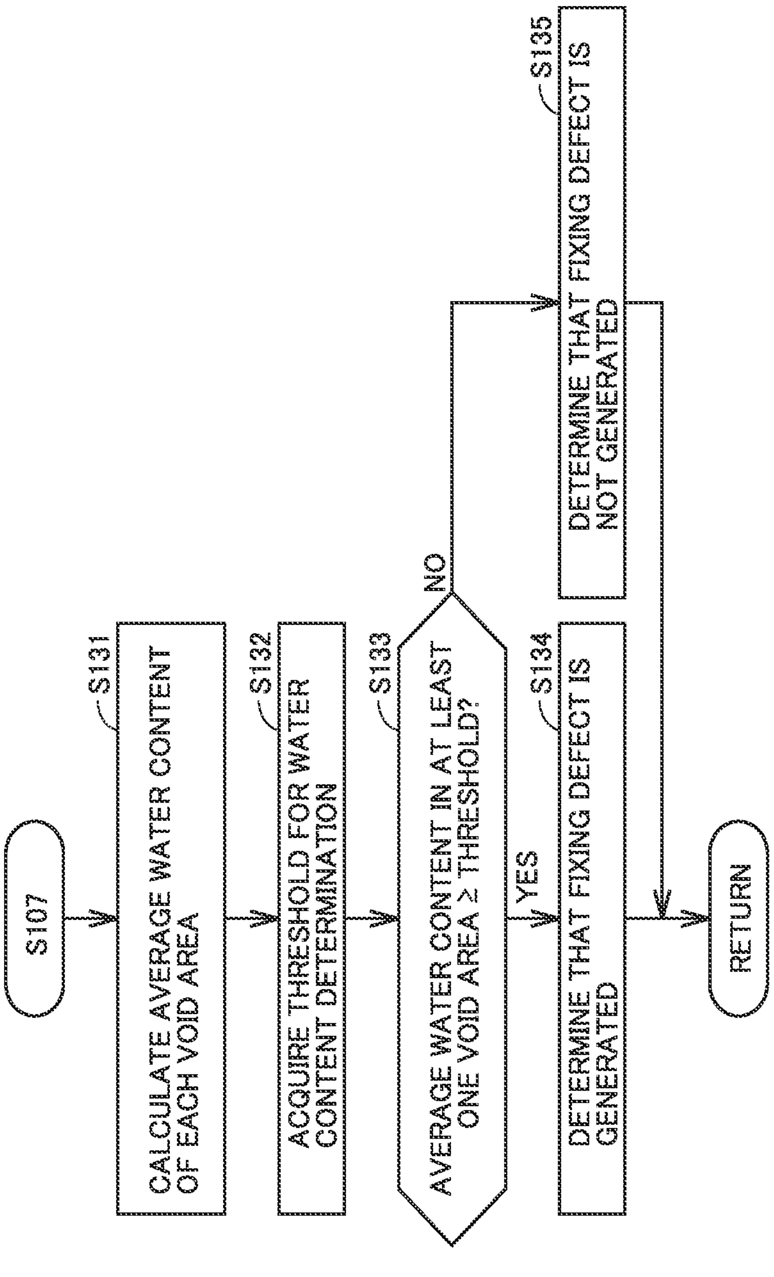
FIG. 25 is a flowchart illustrating a processing procedure of a subroutine in step S107 of the second embodiment.

With reference to FIG. 25, the processing procedure of the determination by water content will be described. FIG. 25 is a flowchart illustrating the processing procedure of the subroutine in step S107 of the second embodiment.

In step S131, processor 201 calculates the average water content of sheet SH in each void area based on the physical property of sheet SH acquired in step S103.

In the example of FIG. 23, processor 201 calculates the average water content of sheet SH for each of void area P1, void area P2, and void area P3. When a certain void area, for example, void area P2 spans at least two areas having different water contents, processor 201 determines an average value of water contents in the at least two areas as the average water content of void area P2.

In step S132, processor 201 acquires the threshold for water content determination corresponding to the image forming condition of image forming unit 204 from threshold table 212 stored in storage 203.

In step S133, processor 201 determines whether the average water content in at least one void area is greater than or equal to the threshold for water content determination corresponding to the image forming condition of image forming unit 204. In the example of FIG. 23, processor 201 determines whether the average water content in at least one void area of void area P1, void area P2, and void area P3 is greater than or equal to the threshold for water content determination corresponding to the image forming condition of image forming unit 204. In the second embodiment, "at least one void area" in the determination by water content means at least one void area among one or more void areas.

When the average water content in at least one void area is greater than or equal to the threshold for water content determination corresponding to the image forming condition of image forming unit 204 (YES in step S133), processor 201 advances the processing to step S134. On the other hand, when the average water content is less than the threshold for water content determination corresponding to the image forming condition of image forming unit 204 in any void area (NO in step S133), processor 201 advances the processing to step S135.

In step S134, processor 201 determines that the fixing defect is generated. In step S135, processor 201 determines that the fixing defect is not generated. After step S134 or step S135, the processing returns to step S108.

Figure 26:
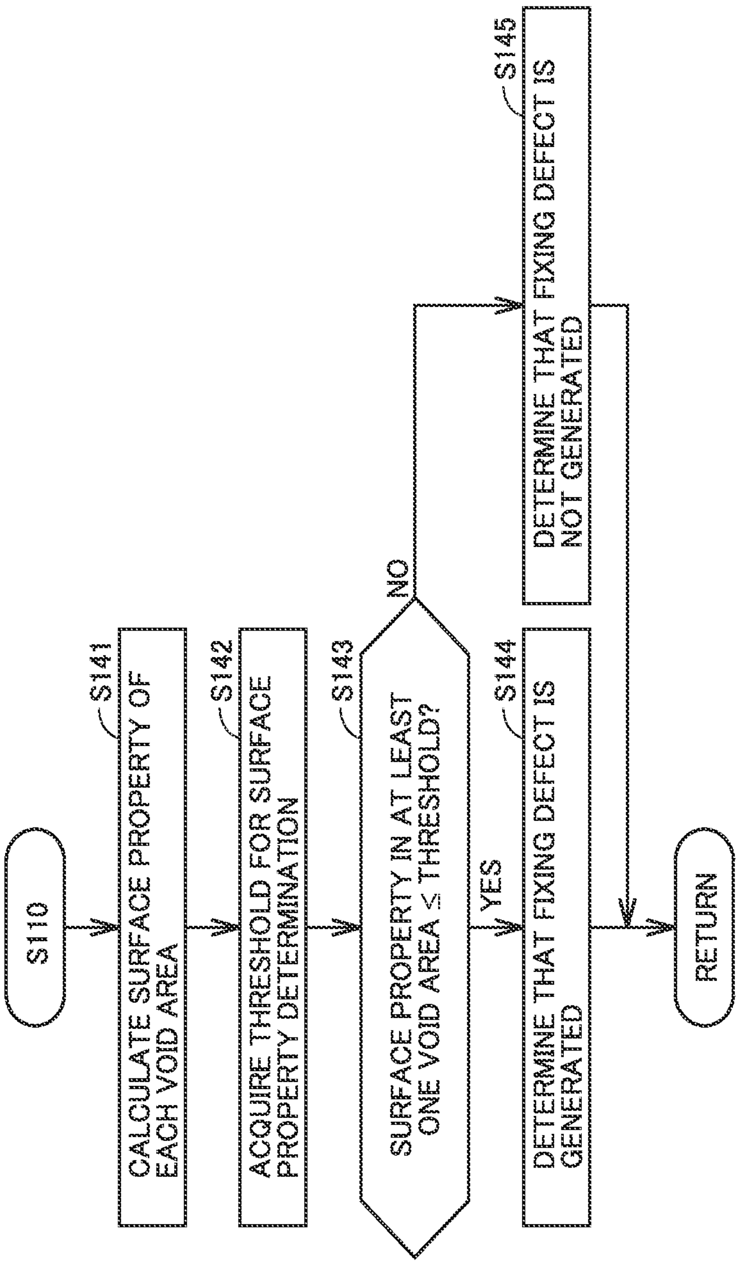
FIG. 26 is a flowchart illustrating a processing procedure of a subroutine in step S110 of the second embodiment.

With reference to FIG. 26, the processing procedure of the determination by surface property will be described. FIG. 26 is a flowchart illustrating the processing procedure of the subroutine in step S110 of the second embodiment.

In step S141, processor 201 calculates the surface property of sheet SH in each void area based on the physical property of sheet SH acquired in step S103. The surface property of sheet SH calculated in step S141 is the surface property of sheet SH on which the image is not formed yet.

In the example of FIG. 23, processor 201 calculates the surface property of sheet SH for each of void area P1, void area P2, and void area P3. When a certain void area, for example, void area P2 spans at least two areas having different surface properties, processor 201 determines an average value of the surface properties of the sheet in the at least two areas as the surface property of the sheet in void area P2.

In step S142, processor 201 acquires the threshold for surface property determination corresponding to the image forming condition of image forming unit 204 from threshold table 212 stored in storage 203.

In step S143, processor 201 determines whether the surface property of sheet SH in at least one void area is less than or equal to the threshold for surface property determination corresponding to the image forming condition of image forming unit 204. In the example of FIG. 23, processor 201 determines whether the surface property of the sheet in at least one void area of void area P1, void area P2, and void area P3 is less than or equal to the threshold for surface property determination corresponding to the image forming condition of image forming unit 204. In the second embodiment, “at least one void area” in the determination by surface property means at least one void area among one or more void areas.

When the surface property of sheet SH in at least one void area is less than or equal to the threshold for surface property determination corresponding to the image forming condition of image forming unit 204 (YES in step S143), processor 201 advances the processing to step S144. On the other hand, when the surface property of sheet SH is greater than the threshold for surface property determination corresponding to the image forming condition of image forming unit 204 in any void area (NO in step S143), processor 201 advances the processing to step S145.

In step S144, processor 201 determines that the fixing defect is generated. In step S145, processor 201 determines that the fixing defect is not generated. After step S144 or step S145, the processing returns to step S111.

Figure 27:
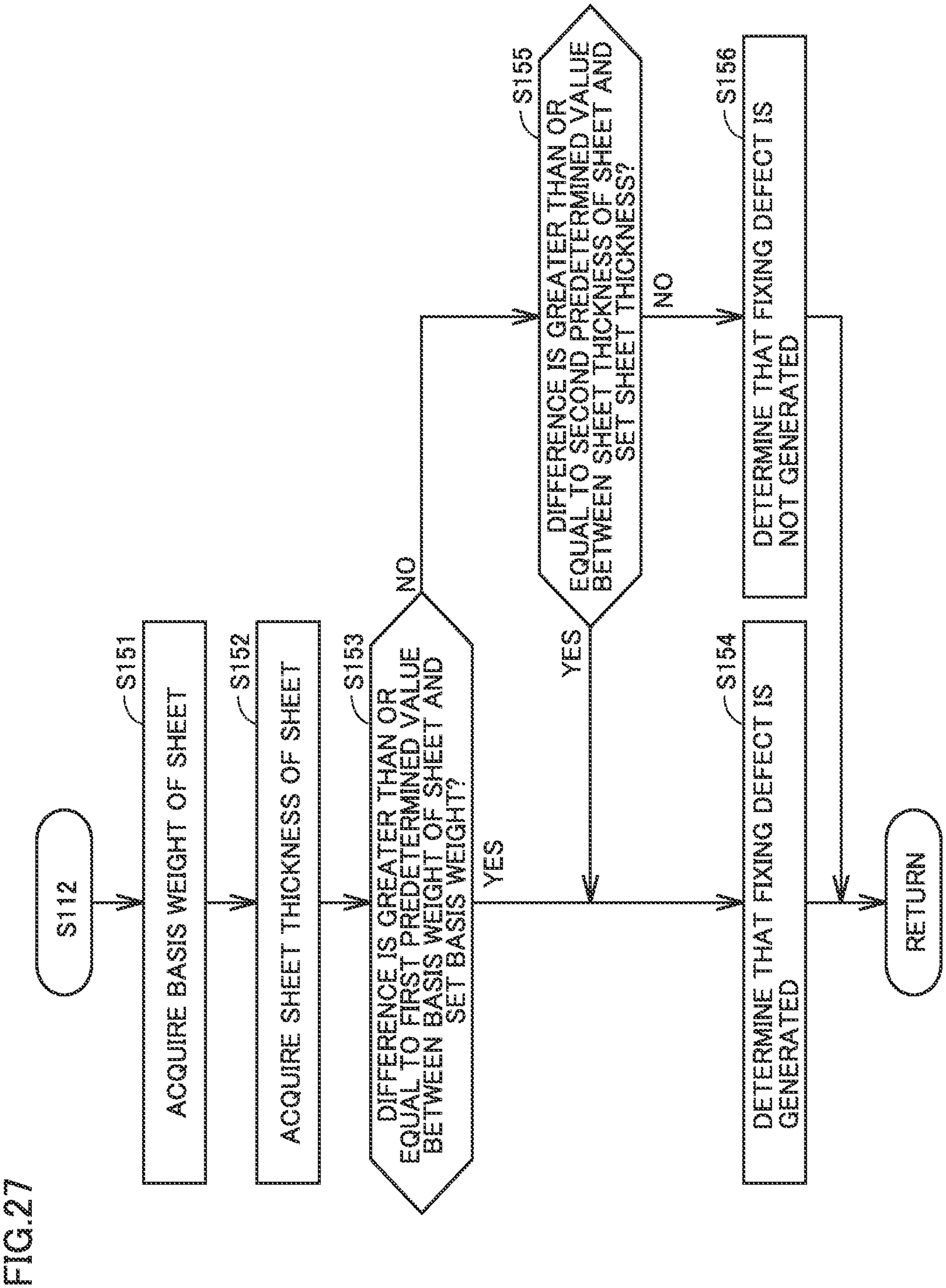
FIG. 27 is a flowchart illustrating a processing procedure of a subroutine in step S112 of the second embodiment.

With reference to FIG. 27, the processing procedure of the determination by basis weight and sheet thickness will be described. FIG. 27 is a flowchart illustrating the processing procedure of the subroutine in step S112 of the second embodiment.

In step S151, processor 201 acquires the basis weight of sheet SH in the physical property of sheet SH acquired in step S103.

In step S152, processor 201 acquires the sheet thickness of sheet SH in the physical property of sheet SH acquired in step S103.

In step S153, processor 201 determines whether the difference is greater than or equal to the first predetermined value between the basis weight of sheet SH and the set basis weight. The set basis weight is included in the image forming condition received from controller 100.

When the difference is greater than or equal to the first predetermined value between the basis weight of sheet SH and the set basis weight (YES in step S153), processor 201 advances the processing to step S154. On the other hand, when the difference is not greater than or equal to the first predetermined value between the basis weight of sheet SH and the set basis weight (NO in step S153), processor 201 advances the processing to step S155.

In step S154, processor 201 determines that the fixing defect is generated.

In step S155, processor 201 determines whether the difference is greater than or equal to the second predetermined value between the sheet thickness of sheet SH and the set sheet thickness. The set sheet thickness is included in the image forming condition received from controller 100.

When the difference is greater than or equal to the second predetermined value between the sheet thickness of sheet SH and the set sheet thickness (YES in step S155), processor 201 advances the processing to step S154. On the other hand, when the difference is not greater than or equal to the second predetermined value between the sheet thickness of sheet SH and the set sheet thickness (NO in step S155), processor 201 advances the processing to step S156.

In step S156, processor 201 determines that the fixing defect is not generated.

After step S154 or step S156, the processing returns to step S113.

As described above, also in image forming system 1 of the second embodiment, when the image defect is found by image inspection unit 551, determination unit 252 determines whether the cause of the image defect is the fixing defect. Consequently, the trouble of the user to investigate the cause of the image defect can be prevented, and the cause of the image defect can be investigated without being affected by the experience value of the user.

Also in image forming system 1 of the second embodiment, when determination unit 252 determines that the cause of the image defect is the fixing defect, the feedback control is performed based on the physical property of sheet SH. Consequently, the appropriate feedback control can be performed without being affected by an experience value of the user, and the trouble of adjustment by the user to eliminate the cause of the image defect can be prevented.

In addition, because the feedback control is performed when the cause of the image defect is the fixing defect, the generation of the fixing defect for the sheet on which the fixing processing is performed after it is determined that the cause of the image defect is the fixing defect.

Image forming system 1 of the second embodiment may include at least image forming unit 204, image inspection unit 551, determination unit 252, and media sensor 400. Accordingly, image forming system 1 of the second embodiment may not include feedback control unit 250. Image forming system 1 of the second embodiment may not include dehumidifying device 302.

The physical property of sheet SH detected by media sensor 400 may include at least one of the resistance value, the water content, the surface property, the basis weight, and the sheet thickness of sheet SH.

When the physical property of sheet SH detected by media sensor 400 does not include the resistance value, processor 201 does not perform the determination by resistance value.

When the physical property of sheet SH detected by media sensor 400 does not include the water content, processor 201 does not perform the determination by water content.

When the physical property of sheet SH detected by media sensor 400 does not include the surface property, processor 201 does not perform the determination by surface property.

When the physical property of sheet SH detected by media sensor 400 does not include the basis weight, processor 201 does not perform the determination by basis weight in the determination by basis weight and sheet thickness.

When the physical property of sheet SH detected by media sensor 400 does not include the sheet thickness, processor 201 does not perform the determination by sheet thickness in the determination by basis weight and sheet thickness.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:

an image forming unit that forms an image on a sheet based on printing data;

a first processor that inspects the image formed by the image forming unit;

a second processor that determines whether a cause of an image defect is a fixing defect when the image defect is found by the first processor; and a media sensor that detects a physical property of the sheet, wherein the second processor determines whether the cause of the image defect is the fixing defect based on the image and the physical property of the sheet detected by the media sensor.

2. The image forming system according to claim 1, wherein the media sensor is provided on an upstream side of the image forming unit in a conveyance path of the sheet.

3. The image forming system according to claim 1, wherein the physical property of the sheet detected by the media sensor includes at least one of a resistance value, a water content, a surface property, a basis weight, and a sheet thickness of the sheet.

4. The image forming system according to claim 1, wherein the second processor performs feedback control based on the physical property of the sheet when determining that the cause of the image defect is the fixing defect.

5. The image forming system according to claim 4, wherein the feedback control includes changing a fixing condition, and the fixing condition includes at least one of a fixing temperature, a nip pressure for fixing, a fixing speed, and an inter-sheet distance.

6. The image forming system according to claim 5, wherein the feedback control is applied to a sheet on which a fixing processing is performed after it is determined that the cause of the image defect is the fixing defect.

7. The image forming system according to claim 6, wherein the feedback control is applied to a sheet on which sheet feeding conveyance is not started at a time point when it is determined that the cause of the image defect is the fixing defect, and the feedback control is applied, on a condition that the fixing processing is not performed and changing of the fixing condition is in time, to a sheet on which sheet feeding conveyance is started at a time point when it is determined that the cause of the image defect is the fixing defect.

8. The image forming system according to claim 4, further comprising a dehumidifying device that dehumidifies a sheet fed to the image forming unit, wherein the feedback control includes performing dehumidification control by the dehumidifying device.

9. The image forming system according to claim 8, wherein the feedback control is applied to a sheet on which sheet feeding conveyance is not started at a time point when it is determined that the cause of the image defect is the fixing defect.

10. An image forming method comprising:

forming an image on a sheet based on printing data with an image forming unit;

inspecting the image with a first processor;

determining whether a cause of an image defect is a fixing defect when the image defect is found with a second processor; and detecting a physical property of the sheet with a media sensor, wherein the determining includes determining whether the cause of the image defect is the fixing defect based on the image and the physical property of the sheet with the second processor.

* * * * *